United States Patent
John

(10) Patent No.: US 11,358,327 B2
(45) Date of Patent: Jun. 14, 2022

(54) METHOD FOR ADDITIVE MANUFACTURING OF A THREE-DIMENSIONAL PRODUCT

(71) Applicant: Ivoclar Vivadent AG, Schaan (LI)

(72) Inventor: Hendrik John, Buchs SG (CH)

(73) Assignee: Ivoclar Vivadent AG, Schaan (LI)

( * ) Notice: Subject to any disclaimer, the term of this patent is extended or adjusted under 35 U.S.C. 154(b) by 56 days.

(21) Appl. No.: 16/810,984

(22) Filed: Mar. 6, 2020

(65) Prior Publication Data

US 2020/0282640 A1 Sep. 10, 2020

(30) Foreign Application Priority Data

Mar. 8, 2019 (EP) .................................. 19161717

(51) Int. Cl.
*B29C 64/135* (2017.01)
*B29C 64/245* (2017.01)
(Continued)

(52) U.S. Cl.
CPC .......... *B29C 64/135* (2017.08); *B29C 64/245* (2017.08); *B29C 64/255* (2017.08);
(Continued)

(58) Field of Classification Search
CPC ............ B29C 64/135; B29C 64/20214; B29C 64/209; B29C 64/245; B29C 64/386;
(Continued)

(56) References Cited

U.S. PATENT DOCUMENTS

| 5,447,822 A | 9/1995 | Hull et al. |
| 8,845,316 B2 * | 9/2014 | Schillen ................ B29C 64/153 |
| | | 425/149 |

(Continued)

OTHER PUBLICATIONS

Hafkamp, T. M. et al., "A Trade-Off Analysis of Recoating Methods for Vat Photopolymerization of Ceramics," pp. 687-711, Solid Freeform Fabrication 2017: Proceedings of the 28th Annual International Solid Freeform Fabrication Symposium—An Additive Manufacturing Conference, Reviewed Paper, The Netherlands, 2017.

*Primary Examiner* — Nahida Sultana
(74) *Attorney, Agent, or Firm* — Ann M. Knab; Thad McMurray

(57) ABSTRACT

The invention is directed to a method for additively manufacturing of a three-dimensional product using top-down stereolithography, wherein flowable, photopolymerizable material in a vat (50) is solidified in a locally selective manner by exposure from above, characterized in that a pressurized gas jet is directed to the surface of the photopolymerizable material, which pressurized gas jet is ejected by a pressurized gas nozzle of a blower (2) which is movable above the liquid level in the vat, wherein the pressurized gas jet is extensive in a direction transverse to the moving direction of the blower, and that by moving the blower with its pressurized gas nozzle across areas of the material surface to be solidify and acts on the surface in this manner, to smooth and level the surface. With such a method multi-component products may be built in which products a further component has to be built attached to an already existing component which (partially) protrude over the liquid level in the vat.

18 Claims, 17 Drawing Sheets

(51) Int. Cl.
  *B29C 64/255*   (2017.01)
  *B29C 64/393*   (2017.01)
  *B33Y 10/00*    (2015.01)
  *B33Y 30/00*    (2015.01)
  *B33Y 50/02*    (2015.01)
  *B33Y 80/00*    (2015.01)
  *B29L 31/00*    (2006.01)

(52) U.S. Cl.
  CPC ..... *B29C 64/393* (2017.08); *B29L 2031/7536* (2013.01); *B33Y 10/00* (2014.12); *B33Y 30/00* (2014.12); *B33Y 50/02* (2014.12); *B33Y 80/00* (2014.12)

(58) Field of Classification Search
  CPC ....... B29C 64/393; B33Y 10/00; B33Y 30/00; B33Y 50/02; B33Y 80/00; B33Y 50/00; B29L 2031/7536
  See application file for complete search history.

(56) References Cited

U.S. PATENT DOCUMENTS

| | | | |
|---|---|---|---|
| 9,457,516 B2* | 10/2016 | Costabeber | B33Y 40/00 |
| 9,802,361 B2* | 10/2017 | Elsey | B29C 64/214 |
| 10,093,064 B2 | 10/2018 | DeSimone et al. | |
| 10,300,663 B2 | 5/2019 | El-Siblani et al. | |
| 10,463,456 B2 | 11/2019 | Ruppert et al. | |
| 2006/0022379 A1 | 2/2006 | Wicker et al. | |
| 2018/0071989 A1 | 3/2018 | Zenou et al. | |
| 2018/0178461 A1* | 6/2018 | Kim | C25D 21/02 |

* cited by examiner

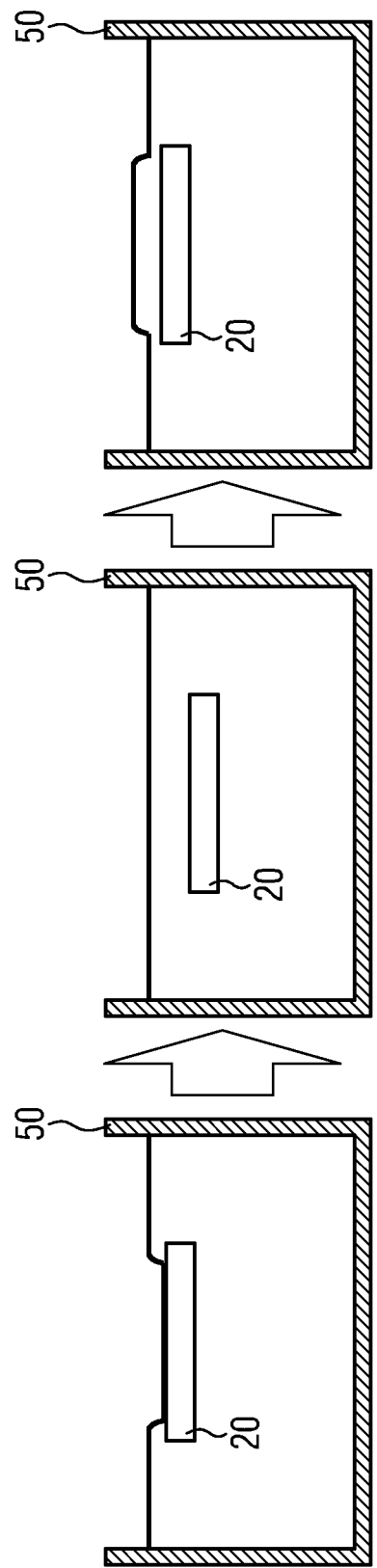

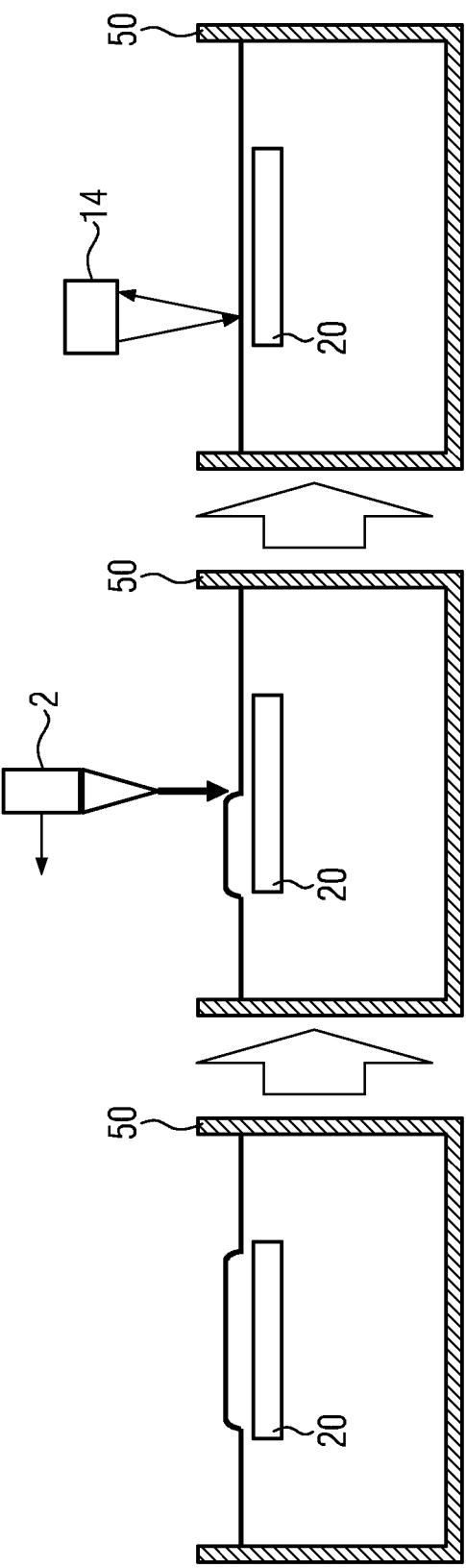

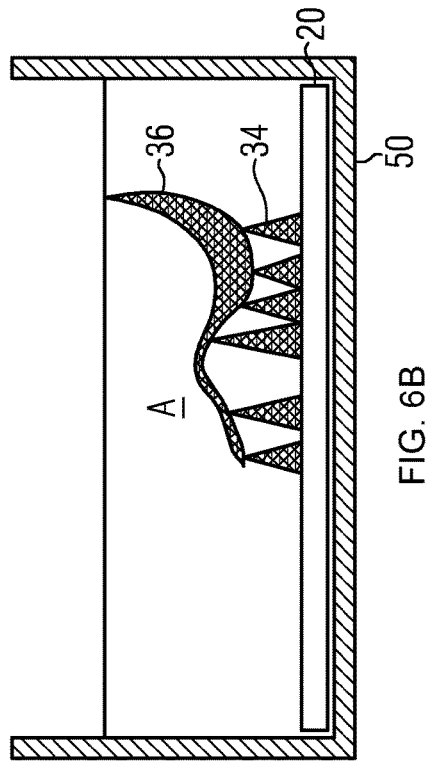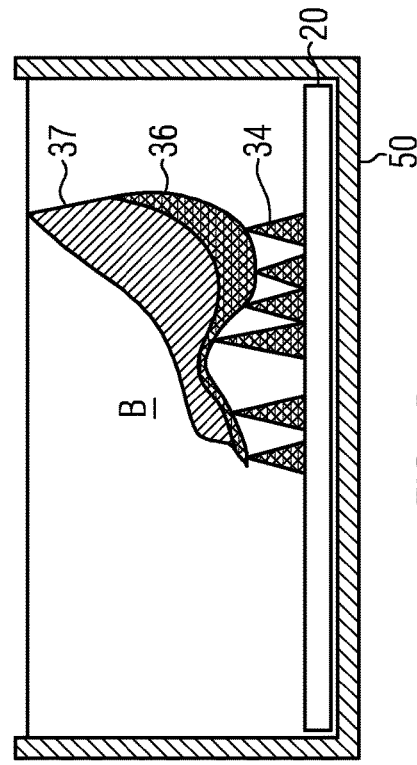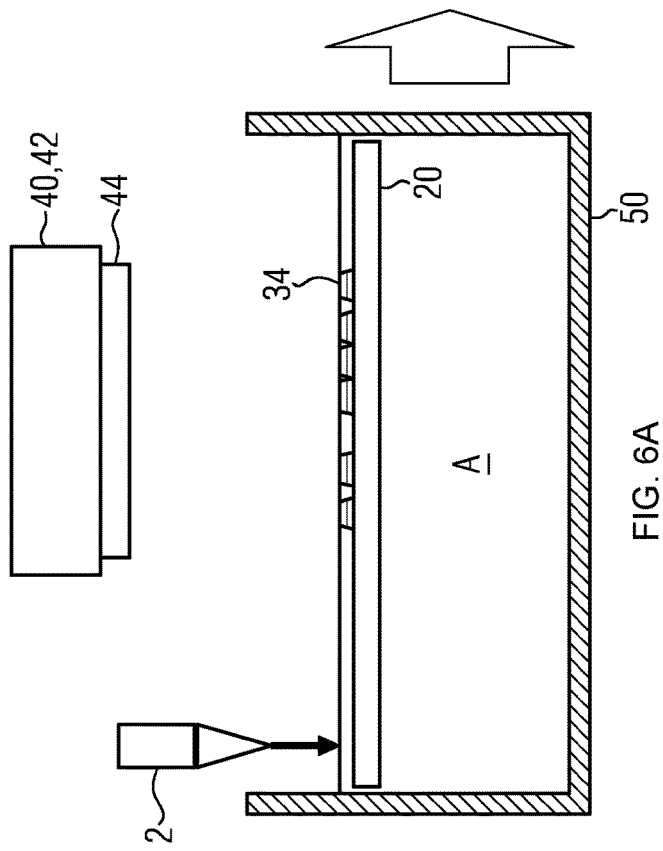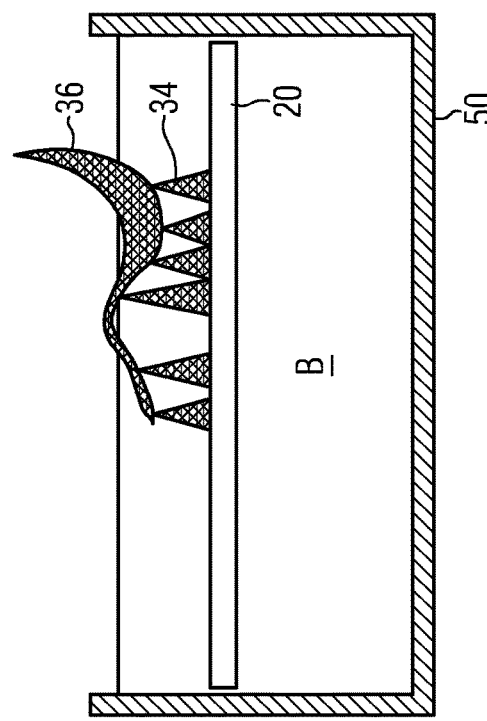

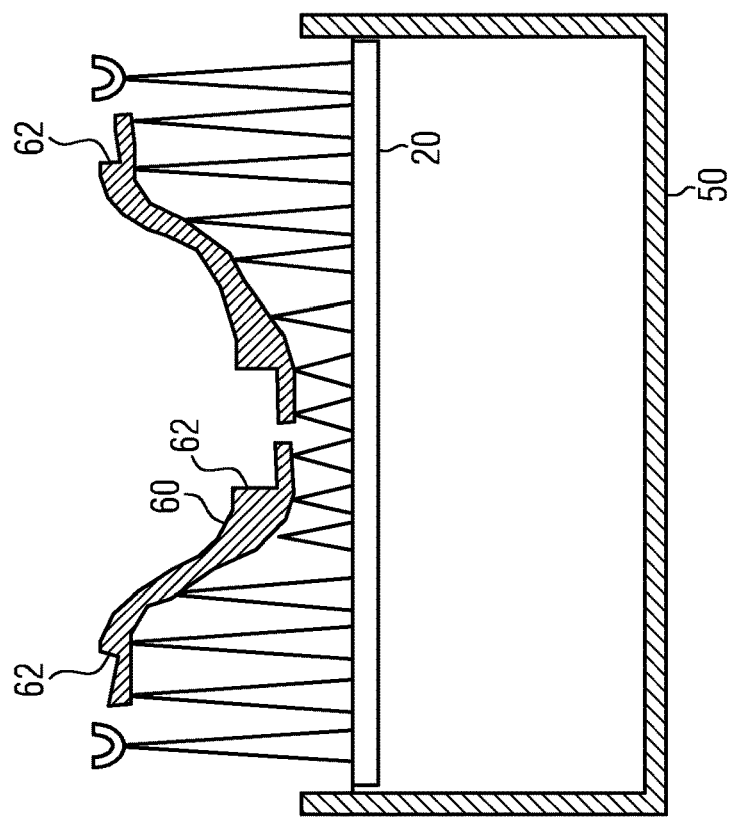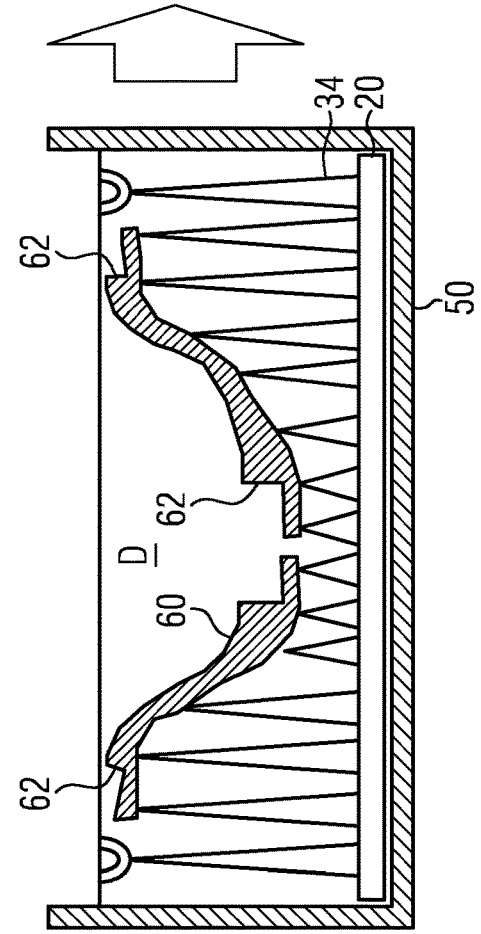
FIG. 8B
FIG. 8A

METHOD FOR ADDITIVE MANUFACTURING OF A THREE-DIMENSIONAL PRODUCT

CROSS-REFERENCE TO RELATED APPLICATIONS

This application claims priority to European patent application No. 19161717.4 filed on Mar. 8, 2019, the disclosure of which is incorporated herein by reference in its entirety.

TECHNICAL FIELD

The present invention is directed to a method for additive manufacturing of a three-dimensional product utilizing top-down stereolithography, wherein a flowable, photopolymerizable material in a vat is cured by locally selective exposure from above.

The invention generally relates to additive manufacturing of three-dimensional products by curing a flowable, photopolymerizable material by stereolithography, wherein the material is cured in subsequent layers in a locally selective manner, wherein the predetermined locally selective exposure area for each layer is determined by the data of a 3D model of the product to be built.

The invention is particularly directed to manufacturing of dental products and orthodontic products, in particular to the manufacturing of dental total prosthesis and partial prosthesis which are composed of a base simulating portions of gingiva and prefabricated teeth, wherein base and teeth consist of different materials in order to be able to simulate the natural properties in the best manner.

BACKGROUND

In a process for manufacturing of a total prosthesis or partial prosthesis which is commonly used, prefabricated teeth are positioned in a positioning template which at the same times forms an injection mold, wherein the positioning template keeps the inserted teeth correctly positioned with respect to each other, whereafter base material, for example polymethylmethacrylate, is injected around the teeth.

In digital process chains artificial teeth and bases are separately manufactured, for example by erosive or additive manufacturing methods, wherein the separately manufactured base and teeth are attached in typical cases by gluing to thereby anchor the teeth in the base. The pre-manufactured teeth can be pre-manufactured standard teeth or can be individually manufactured artificial teeth.

Manufacturing of dental and orthodontic products, for example different kinds of partial prostheses and dental braces, from several components still involves a lot of manual work. Model casting, shaping operations by robots for bending wires and metal braces, as well as additive manufacturing steps for further components of the product may be of assistance in the manufacturing process, but a completely and continuously digital building process at present cannot yet be realized. In this connection it is particularly problematic if metal components, such as wires or brace components, have to be embedded in further components which are manufactured for example from plastics. Up to now this has been achieved by introducing the metal components into a pressing mold and by injecting resin to form over-molds around the metal components. Alternatively an orthodontic plate can be made of plastics, in which plates recesses for the metal components to be integrated are provided. After inserting the metal components into the recesses, the recesses can be filled by manually pouring resin material to overmold the inserted metal components, whereafter the surfaces are finished by grinding and polishing. In any case many individual manufacturing steps and manual intermediate steps are necessary which bars the way to a substantially digitized process chain.

In WO 2016/083296 A1 and corresponding U.S. Pat. No. 10,463,456, which is hereby incorporated by reference in its entirety, a method for manufacturing a dental prosthesis by printing a base of the prosthesis onto teeth of the prosthesis is described. In this method the teeth of the prosthesis are fixed in an occlusal plate such that the basal end portions of the teeth of the prosthesis are exposed. The basal surfaces of all teeth are shortened by grinding them down until all basal surfaces lie in the same plane. Thereafter, the occlusal plate including the prosthetic teeth is inserted into a holder of a stereolithographic 3D printer. In this connection a bottom-up stereolithographic method is described in which the occlusal plate is coupled to a vertically moveable building platform such that the teeth are suspended therefrom with their basal end faces facing downwards. The basal end portions of the prosthesis teeth are then, by lowering the building platform towards a vat filled with photopolymerizable liquid, immersed until the teeth with their downwardly facing basal surfaces are in abutment on the bottom plate of the vat. The bottom plate is transparent in the building area, and underneath the bottom plate an exposure unit for a location-selective exposure is provided. In this manner a first layer can be cured by exposure, which first layer embeds the basal end portions of the immersed teeth. All subsequently cured layers are formed by successively raising the building platform and the teeth with the layers already formed thereon, and by further locally selectively curing of layers of the base of the prosthesis. With this method the maximum depth the teeth that can be embedded in the additively manufactured base corresponds to the maximum curing depth of the photopolymerizable material of the base, which maximum curing depth typically is in the range of millimeters. In addition, the borderline between the added prosthesis base and the teeth is a straight line, namely the borderline of the photopolymerizable material which is defined after lowering the building platform towards the photopolymerizable material by the liquid level when the basal surfaces are in contact on the bottom plate of the vat. This causes an unnatural look and appearance of the total prosthesis because in a human dentition the borderline between the gingiva and the teeth is not a straight line. In particular, it is not possible with the method described to generate raised portions in the border region of neighboring teeth to simulate the natural gingiva papillae.

Besides the extensively described method, as just explained above, it is also a mentioned that the teeth on the building platform may be lowered into photopolymerizable material which then may be exposed from above. This alternative which is not further described corresponds to a top-down stereolithography process in which the photopolymerizable material to be cured has to be leveled by a doctor blade which spreads the photopolymerizable material.

In bottom-up stereolithography methods the layer thickness of the layer to be solidified next can be defined in a precise manner by lowering the building platform, for the first layer to be formed, up to a depth into the photopolymerizable material until the lower surface of the building platform is at a level above the vat bottom corresponding to the desired layer thickness, i.e. by displacing material from the region between the building platform and the vat bottom the desired layer thickness between the lower surface of the building platform and the vat bottom is precisely set. For the layers to be cured subsequently the distance between the lower surfaces of the last cured layer to the vat bottom is set in a corresponding manner as described before.

In methods using top-down stereolithography, such layer definition with a desired thickness for the next layer to be cured using a reference plane (which is the building plane at the same time) is not possible. In top-down stereolithography a layer of photopolymerizable material with defined layer thickness has to be defined on the upper surface of the building platform (for the first layer to be cured) or on the upper surface of the last cured layer. For this purpose the building platform is lowered further down as the desired layer thickness for the next layer into the photopolymerizable material in the vat (also known as "deep dipping") so that photopolymerizable material may flow over the building platform or the last polymerized layer. Thereafter the building platform is raised again up to the desired level of the layer thickness of the next layer, i.e. the difference between the distances of lowering and raising again is equal to the desired layer thickness. However in this manner no layer with smooth surface and uniform thickness is obtained in most cases, but a meniscus is formed above the building platform or the last cured layer, respectfully, wherein the layer thickness or height of the meniscus typically is larger, for example 0.5 mm-1.5 mm, than the desired layer thickness for building which typically is in the range 0.05 mm-0.15 mm. The higher the viscosity and/or the surface tension of the material is the thicker the meniscus formed is. When this occurs during layer-wise additive manufacturing the lack of precise definition of the layers to be cured would result in significant inaccuracies of the object built. The formation of such meniscus is illustrated in FIG. 1, wherein in FIG. 1A a building platform 20 is already lowered into the photopolymerizable material in the vat 50; the building platform 20 has to be lowered further down into the vat 50 by a distance greater than desired layer thickness, as shown in FIG. 1B, so that the photopolymerizable material flows across the surface of the building platform 20. Thereafter, the building platform is raised again, as shown in FIG. 1C, until the building platform is, compared to the liquid level in the areas laterally surrounding the building platform 20, at a depth below this level equal to the desired layer thickness; however, when raising the building platform to the this level also material on top of the building platform 20 is raised and does not completely flow off the building platform so that the above-mentioned meniscus remains on top of the building platform 20. Such inaccuracies which may result in deviations of more than 1 mm of the layer thickness above the desired value are not acceptable.

Conventionally solid doctor blades are used to smooth and level the surface of the layer of photopolymerizable material, which doctor blades can be driven to move across the surface of the last formed layer. A doctor blade assembly includes a doctor blade suspended to be horizontally moveable (horizontal is a direction in a plane parallel to a liquid level), wherein the lower edge of the doctor blade is adjustable to a defined height. The moveable doctor blade is moved across the building area at such a height level that photopolymerizable material is pushed ahead by the moving doctor blade, and such that a smoothed layer of photopolymerizable material having the desired layer thickness remains behind the doctor blade.

During the building process of products there may be situations and constellations in which a doctor blade is not usable, for example when there is a previously manufactured building part of the product, to which building part layers of another material should be added and attached, and when for a layer of the other photopolymerizable material the previously manufactured building part projects beyond the surface of the other material. In such situations doctor blade assemblies are not usable because a doctor blade moving across the surface would collide with protruding parts.

Similar complications arise if a product is to be built in another structure which has, laterally next to the product to be built, protruding projections.

In such constellations bottom-up stereolithography is per se not usable, and also top-down stereolithography with massive doctor blades cannot be performed, for which reason also the field of applicability of top-down stereolithography is limited.

US 20060022379, U.S. Pat. No. 5,447,822, US 20180071989, U.S. Pat. Nos. 10,093,064, and 10,300,663, are directed to additive manufacturing methods/devices and are hereby incorporated by reference in their entirety.

SUMMARY

It is an object of the present invention to provide an improved top-down stereolithography method which is usable also in the above-described situations in which so far top-down stereolithography methods were not usable at least in cases in which more viscous, but still flowable materials which do not level themselves are to be used, but a precise definition of the layer surface of the next to be cured layer is required in order to be able to manufacture building parts by additive manufacturing in a precise manner.

This object is achieved by the method for additive manufacturing of a three-dimensional product, said method comprising the features of the claims. Preferred embodiments of the invention are set out in the dependent claims.

In a method for additive manufacturing of a three-dimensional product utilizing top-down stereolithography, in which method flowable, photopolymerizable material in a vat is cured in a locally selective manner by exposure from above, in accordance with the present invention the following is done in order to smooth and level the surface of the next material layer to be cured. To the extent the previously cured layer has been leveled in the same manner before the exposure, i.e. has been brought to a uniform level with the liquid level in the areas surrounding the building platform, in this manner also a defined and uniform layer thickness is generated. A pressurized gas jet from a pressurized gas nozzle of a blower which is moveable at a distance vertically above the liquid level in the vat is generated and directed to the surface of the photopolymerizable material by moving the blower with the pressurized gas nozzle across the areas of the surface to be cured, said pressurized gas jet being extensive in a direction transverse to the direction of movement of the pressurized gas nozzle and said pressurized gas jet, said pressurized gas jet acting on this surface while it is moved across it to smooth the surface. Due to the impact of the pressurized gas jet, which extends transverse to its moving direction across the surface, photopolymerizable material is displaced from regions having a raised surface of photopolymerizable material, whereby the surface is leveled to a uniform level with the liquid level laterally surrounding the building in the vat. If reference is made to a distance of the pressurized gas nozzle to the material surface, this distance is defined as the orthogonal distance to the surface level of the flowable material around the building platform in the vat. Before smoothing and leveling by the pressurized gas jet moving across the surface took place, the orthogonal distance to the material surface can deviate from the above-defined distance because in the region above the building platform the material surface can be deformed, for example because of a meniscus formed there.

According to the present invention, in a top-down stereolithography method, a pressurized gas jet extensive in a direction transverse to its moving direction is generated by a pressurized gas nozzle and directed to the surface of the photopolymerizable material and moved across the surface in order to level the surface. The pressurized gas nozzle acts with its pressurized gas jet extensively transverse to its moving direction as an air doctor blade (in the case of pressurized air as pressurized gas), wherein the air doctor blade is, different from a conventional mechanical doctor blade, generated by a pressurized air nozzle at a distance above the surface of the photopolymerizable material, but nevertheless acts by the pressurized air stream directly on the material surface.

A blower in the sense of the present disclosure is considered generally as a pressurized gas source having a pressurized gas nozzle which discharges a pressurized gas stream from the pressurized gas source as a shaped pressurized gas jet and as a directed volume flow stream. As a pressurized gas source a motor driven pump (fan) or a pressurized gas tank can be used. The pressurized gas source can be directly connected to the pressurized gas nozzle, and pressurized gas source and pressurized gas nozzle can form a coherent assembly. In many cases pressurized air is utilized as pressurized gas so that the blower comprises a pressurized air source and a pressurized air nozzle connected thereto, which ejects a pressurized air jet. As an alternative to pressurized air another gas can be supplied under pressure, such as an inert gas, e.g. nitrogen, to reduce or prevent inhibition on the material surface.

In a preferred embodiment the method according to the invention is utilized to manufacture a multi-component product, in order to attach by a method of the present invention to an already existing component of the product to be built, a further component of the product to be built. In this connection the already existing component, which is carried by a building platform located below the already present component, is lowered by lowering the building platform in the vat containing the flowable, photopolymerizable material and is then raised again by a lower distance, wherein the difference between the lowering distance and the raising distance is equal to the desired layer thickness, to thereby form the next layer to be exposed. It is possible that during these steps flowable, photopolymerizable material also flows over portions of the already present component, if this already present component by lowering the building platform gets below the liquid level of the photopolymerizable material in the vat. The pressurized gas nozzle is suspended to be horizontally moveable at a height level such that it lies after the first lowering and raising for forming a new layer of photopolymerizable material at a higher level than the highest point of the already existing component. For this reason the pressurized gas nozzle can be adjustable with respect to the height at which it is moveable across the vat, to allow it to adjust the height of the pressurized gas nozzle to a level above the height of the already present component. In this manner it is achieved that the pressurized gas nozzle can be moved across the building area in order to smooth and level areas of the photopolymerizable material to be cured by means of the stream of pressurized gas, without colliding with protruding parts of the already existing component. After smoothing the surface the photopolymerizable material is exposed in a locally selective manner for the present layer to be cured in order to solidify the layer in the desired shape. The steps of lowering and raising for defining a new layer of photopolymerizable material, of moving the pressurized gas nozzle with its pressurized gas jet across the surface of the next to be cured layer for its smoothing, and of the subsequent locally selective exposure for solidification are repeated as often as required until the further component of the product to be built has been attached to the already existing component.

In principle it is possible with this method to add and attach further portions in lateral and vertical directions to an already existing component.

In this manner also different zones of a prosthetic tooth can be added using different materials.

In a preferred embodiment the distance to the surface of the photopolymerizable material is measured using a distance sensor fixedly attached to the pressurized gas nozzle. In this manner the distance to the surface of the photopolymerizable material can be determined in a positioned dependent manner, and thereby elevations as in the case of a meniscus can be determined as well as, after applying the air jet, the elimination of elevations by displacement of material can be determined. In this case it is particularly preferred that the distance to the surface of the photopolymerizable material as measured by the distance sensor is used to control operating parameters of the blower which is moving across the surface of the photopolymerizable material. In this manner the gas jet is adjusted such that it displaces photopolymerizable material in the region of a meniscus or of any other elevation and smoothes the surface such that after application of the pressurized gas nozzle (e.g. air doctor blade) a surface leveled as a whole (i.e. including the liquid level surrounding the building platform) is obtained and a defined layer thickness of the photopolymerizable material for position-selective solidification is formed, i.e. a uniform liquid level is formed. The intensity of the gas stream can be controlled using various control variables such as the distance to the surface of the photopolymerizable material, the volumetric flow rate, the airflow velocity, the lateral extension of the gas jet, while the nozzle is moved across the building area, such that uniform distance to the surface and therefore a uniform liquid level is realized, which means that the surface of the photopolymerizable material has been smoothed and leveled in a controlled manner and that menisci have been eliminated.

The sensor may include, but is not limited to, ultrasonic, optical, LED, IR sensors, and the like, which emit one of the mentioned signals and sense a parameter of the reflected signal to determine the distance. The method of determination of the distance can include, but is not limited to, triangulation, time-off flight (TOF) or phase measurement.

In a preferred embodiment the control of the operating parameters of the blower for smoothing and leveling the surface of the photopolymerizable material is performed by controlling the pressure of the gas, the width of the pressurized gas stream, the volumetric flow rate, the moving velocity of the pressurized gas nozzle across the surface and/or the inclination of the pressurized gas jet ejected by the pressurized gas nozzle with respect to an axis orthogonal to the surface of the photopolymerizable material, in order to realize a uniform distance to the surface of the area to be solidified and thus to achieve a uniform liquid level.

Such control or regulation on the other hand is not necessarily required because it is possible to determine in advance for different material properties of photopolymerizable materials suitable operating parameters for the pressurized gas nozzle and to select for a particular building process using a particular photopolymerizable material the associated operating parameters which are suitable for displacing and leveling this photopolymerizable material.

In a preferred embodiment the pressurized gas nozzle is moved across the surface of the photopolymerizable material to be cured, wherein the pressurized gas nozzle is formed with an elongated nozzle gap which is extending in a direction transverse to the moving direction of the nozzle, and is formed as an air doctor blade (air blade), wherein the angle of inclination of the ejected pressurized air stream is adjustable in the range of +−45° with respect to the orthogonal direction on the surface of the photopolymerizable material, in particular is oriented orthogonal to the surface.

In a preferred embodiment the already existing component is at least partially enclosed by cured photopolymer as a further component such that the already present component is, in the building area of the further component, enclosed by cured photopolymer.

In a preferred embodiment the pre-existing component is a denture or artificial tooth arch or a part thereof. The artificial dental arch or the part of it is carried by the building platform such that the basal side faces upwards. As a further component a prosthetic base or a part thereof is attached to surround the basal portions of the artificial dental arch or the part thereof, whereby the artificial dental arch or the part thereof is with its basal portions embedded in the attached prosthetic base in a positive-locking fit.

In a preferred embodiment different photopolymerizable materials are used subsequently to add several further components for building the product. In this manner desired material zones, material layerings and material variations can be created in the product.

In a preferred embodiment the already existing component, to which, using a method as described above, a further component is attached, the component itself is a component which has been built using a method according to the present invention.

In a preferred embodiment, in a first phase of the method, a first part of the product is built up using a method as described above, wherein a recess for inserting an already existing component is formed in the first part. The already existing component is placed in the at least one recess, and thereafter a remaining second part of the product is built using the above described methods such that the already existing component inserted in the recess is enclosed by the two built up parts and is at least partially embedded therein. This preferred method is for example suitable for building orthodontic products, such as dental braces which comprise an orthodontic plate including partially integrated metal parts (wires, bracket elements, etc.). In this case a first phase of the building process can be used to create a first part of the orthodontic plate by layer-wise polymerizing material, wherein this first part includes recesses for components to be inserted. After completion of the first part it remains on the building platform which is, for easier handling, lifted up out of the material in the vat, wherein the first part is optionally cleaned by blowing using the pressurized gas nozzle, in order to make the recesses better accessible for the steps of inserting further components. Into these recesses, insert components are then placed according to the provided design (for example wires and bracket elements as insert components), whereafter the additive building process is continued by building of the second building part of the orthodontic plate, whereby the recesses are filled and therefore the insert components are embedded, and the insert components are at least partially integrated in the orthodontic plate.

In a preferred embodiment of this method the inserted existing component is a metal part, a plastic part, a composite part or a ceramic part which in this manner is at least partially integrated in the dental or orthodontic product.

With such a method according to the invention it is possible to manufacture a dental partial prosthesis in which the teeth and the gingiva portion are built by additive manufacturing according to the invention, and mounting elements made of cast metal are added and embedded as insert components in the gingiva portion (prosthetic base) in which they are embedded in a positively fitting manner.

In a preferred embodiment the building platform is, after an exposure step, lifted up to a level above the liquid level, and the portion already built is cleaned by blowing using a pressurized gas jet from the blower, in order to remove any excess of adhering, unpolymerized material; optionally the building platform is thereafter immersed in a bath of cleaning liquid, raised up from the bath again, and the already built parts are dried by directing a pressurized gas jet from the blower to the parts.

Furthermore, an apparatus for performing the method according to the invention is provided, which apparatus comprises a control unit in which a digital 3D model of the components to be built as the product is stored, a vertically moveable exposure unit which is adapted to, under the control of the control unit, expose photopolymerizable material in a vat layer by layer in a locally selective manner from above, a vertically moveable building platform for carrying the product being built, which building platform can be lowered under the control of the control unit vertically into the photopolymerizable material in the vat, wherein the control unit is adapted to lower the building platform successively by more than one layer thickness and to raise it again except for one layer thickness in order to form a new layer of photopolymerizable material, and thereafter to operate the exposure unit for locally selective exposure in the area predetermined for this layer in order to solidify the layer in the predetermined shape determined by the 3D model, and to repeat the last two steps until the product or a component of the product is built in the predetermined three-dimensional shape. A blower comprising a pressurized gas source and a pressurized gas nozzle is installed on top of the vat, wherein the pressurized gas nozzle is suspended above the vat and is moveable under the control of the control unit to be moved across the surface of the photopolymerizable material in the vat. The pressurized gas nozzle can be moveable together with the pressurized gas source as an integrated assembly; alternatively, the pressurized gas source may be stationary installed and be connected by a flexible tube to the moveable pressurized gas nozzle. The pressurized gas nozzle is configured in order to direct a pressurized gas jet to the surface of the photopolymerizable material, which pressurized gas jet is extensive in a direction transverse to the moving direction of the pressurized gas nozzle across the surface, whereby the pressurized gas jet from the pressurized gas nozzle after each step of further lowering and raising the building platform again for forming a new layer of photopolymerizable material smoothes and levels the surface of this layer by the action of the pressurized gas jet.

A process control unit or control unit can be implemented by any kind of computer hardware capable of executing CAD/CAM applications, i.e., capable of storing CAD design data of an object, and capable of executing a CAM program for providing instructions from manufacturing devices to produce the object according to the CAD design data. In some cases, the control unit executes a CAM application (for sterolithography) and in the course of this process provides control commands for successive activations of the exposure unit for successive solidification of layers of photopolymerizable material, and for successive vertical movements of the exposure unit. This computer hardware can be, but is not limited to, a programmable logic controller (PLC), a standard PC, a workstation, or even a tablet computer.

In a preferred embodiment the exposure unit comprises projection optics which on the object side realizes a telecentric imaging. This has the advantage that light from the exposure unit is directed to the material surface to be incident essentially along an orthogonal direction which minimizes a possible shadowing of the surface by already present components protruding above the surface to which material layers are to be additively attached.

BRIEF DESCRIPTION OF THE DRAWINGS

The invention will now be described with reference to exemplary embodiments in connection with the drawings in which:

FIGS. 1A, 1B and 1C show subsequent steps during lowering of a building platform into a vat with photopolymerizable material;

FIGS. 2A, 2B and 2C show further subsequent steps for leveling the surface of the photopolymerizable material according to the method of the present invention;

FIGS. 6A, 6B, 6C, 6D, 6E and 6F show subsequent steps in a building method of the present invention, wherein an artificial tooth is built using different materials;

FIGS. 8A, 8B, 8C, 8D, 8E, and 8F show subsequent steps of a method according to the present invention, wherein an orthodontic plate with integrated metal parts is built.

DETAILED DESCRIPTION

Figure 3B:
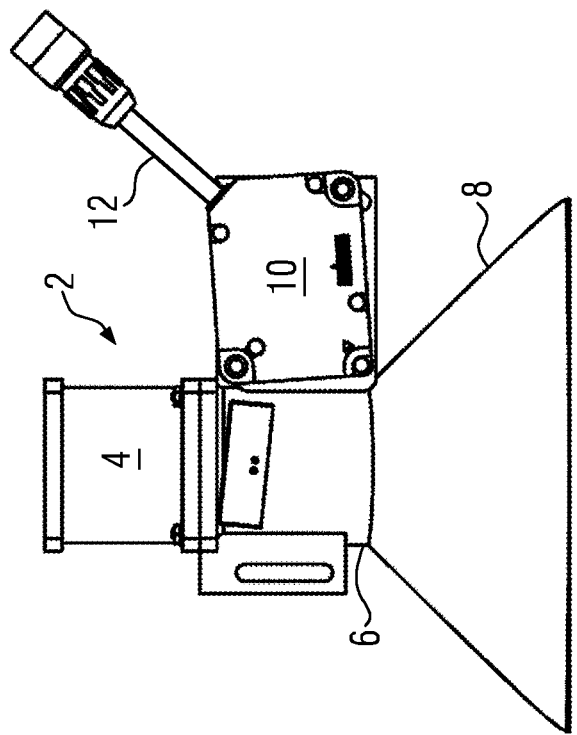
FIGS. 3A and 3B show two plan views of a pressurized gas nozzle from two different directions, which pressurized gas nozzle is usable in a method according to the invention for building a product.

In the following description of the embodiments described in connection with the Figures it is assumed that as pressurized gas, pressurized air is used which is supplied to a pressurized air nozzle to generate an extensive pressurized air stream in order to act on a surface of photopolymerizable material, i.e. throughout the following Figure descriptions the terms pressurized air instead of pressurized gas, and pressurized air nozzle instead of generally pressurized gas nozzle are used. The pressurized air can be provided by a fan or by a pressurized air storage tank, and can be supplied to a pressurized air nozzle, wherein the fan or the pressurized air storage tank may form an integrated assembly with the pressurized air nozzle.

With reference to FIGS. 1A to 1C it is first explained how in a top-down stereolithography method the formation of an elevated surface area (meniscus) in the region above the building platform may occur. In FIGS. 1A to 1C the building platform 20 is shown schematic and simplified, without the lifting mechanism carrying the building platform. For forming a first layer of photopolymerizable material which is to be solidified and attached to the building platform the following steps are taken. FIG. 1a) shows the building platform 20 while it is lowered into the photopolymerizable material in a vat 50, wherein in the early stage of lowering of FIG. 1a) the lowering depth is too small for photopolymerizable material which is flowable, but has a certain viscosity to flow across the surface of the building platform 20. For this reason the building platform is lowered even deeper as it is actually required for the desired layer thickness to a depth in which the photopolymerizable material is able to flow across the building platform. This is shown in FIG. 1b) in which the photopolymerizable material already flowed across the surface of the building platform 20.

In order to form a layer of photopolymerizable material on the building platform 20 having the desired, lower layer thickness the building platform 20 is raised again until it is at a depth of the desired layer thickness underneath the liquid level of the photopolymerizable material in the vat 50 in the region surrounding the building platform 20, i.e. below the liquid level laterally next to the building platform. When raising the building platform to this depth of a layer thickness below the liquid level not the entire excess of photopolymerizable material flows off the building platform, but a raised area remains as a meniscus, as shown in FIG. 1C. Such a meniscus may have a significant height of more than 1 mm, and may therefore significantly interfere with a precise definition of a layer of photopolymerizable material having a precisely defined layer thickness. In conventional methods a doctor blade is used in such situation, which doctor blade is moved with its lower edge parallel to the liquid level to push photopolymerizable material ahead and out of the region of the meniscus to thereby form a smooth surface and a layer having a defined layer thickness on the building platform.

As explained in the introduction, the method according to the present invention is aiming to avoid use of a physical doctor blade so that also building situations can be handled in which components protrude beyond the liquid level in the vat which makes use of a physical doctor blade impossible since such physical doctor blade would collide with such a protruding component. According to the present invention a blower 2 including a pressurized air nozzle is utilized which may be moved at a distance above the surface of the photopolymerizable material to smooth and to level its surface, wherein the pressurized air nozzle directs an extensive pressurized air stream to the surface in order to smooth and level it. In this manner photopolymerizable material is in particular displaced from the region of the meniscus, as illustrated in FIG. 2B. The displacement of photopolymerizable material from the meniscus results in a minimal raise of the liquid level next to the building platform, and thus also above the building platform, when the liquid level as a whole has been leveled. This effect can be taken into account in the definition of the layer thickness by raising the building platform 20 up to a level below the liquid level in FIG. 2A so that after displacement of the photopolymerizable material from the meniscus the desired layer thickness above the building platform remains.

Figure 3A:
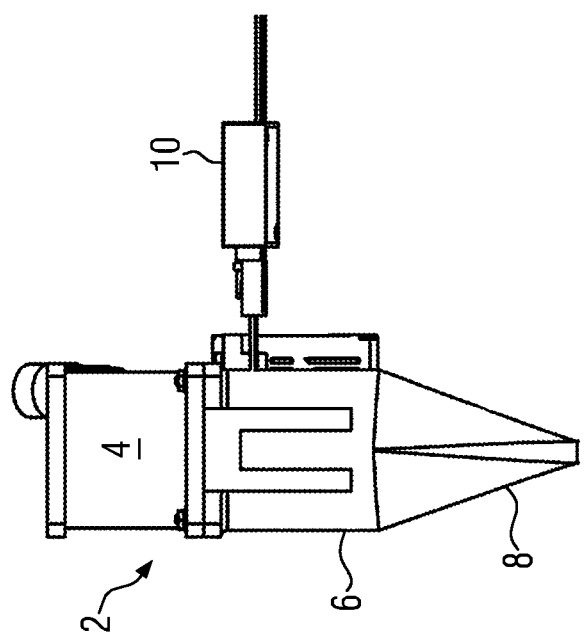

FIGS. 3A and 3B show two plan views of a blower 2. The blower 2 is comprised of a fan in the fan housing 4, housing part 6 for supplying pressurized air from the fan to the pressurized air nozzle 8 which has, at its lower end, an elongated nozzle gap which ejects an elongated pressurized air jet. FIG. 3A is a side view in which the longitudinal direction of the nozzle gap is perpendicular to the Figure plane, and FIG. 3B is a plan view with a view direction that is rotated by 90° with respect to the view direction of FIG. 3A, wherein in FIG. 3B the longitudinal direction of the nozzle gap lies within the Figure plane. The pressurized air nozzle 8 is with its upper end directly connected to the intermediate housing or conduit part 6. The pressurized air nozzle 8 has in both views of FIGS. 1A and 1B in an opposite sense a truncated cone shape such that the nozzle housing is tapering towards its lower end in FIG. 1A to a narrow nozzle gap at its lower end, whereas, in the view rotated by 90° in FIG. 1B, it is flaring with a truncated cone shape to form a nozzle gap extensive in longitudinal direction. The longitudinal extension of the nozzle gap typically spans the size of the building field in X or Y direction. The width of the nozzle gap perpendicular to its longitudinal extension may for example be in the range from 0.1 to 10 mm, preferably in the range of 0.5 to 2 mm.

It should be noted, however, that a pressurized air nozzle in the sense of the present invention is not limited to pressurized air nozzles having a longitudinally extensive nozzle gap. Other nozzle opening profiles are possible in which longitudinal and transverse extensions of the nozzle opening have the same or similar sizes such that a large area nozzle jet is generated. It is also possible that several separate nozzle openings which are arranged as an array, in cooperation generate a pressurized air jet extending over an area.

Figure 4C:
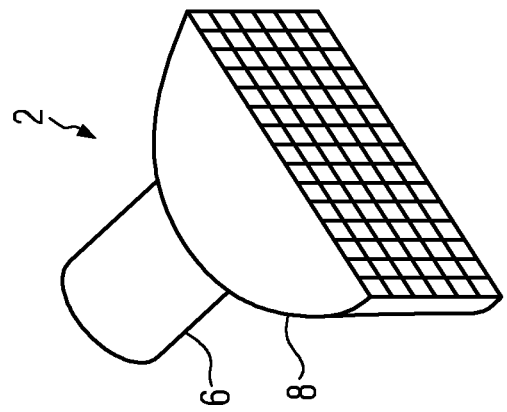
FIGS. 4A, 4B and 4C show schematic illustrations of various embodiments of blowers including pressurized gas nozzles by which extensive gas streams can be generated from supplied pressurized gas to act on photopolymerizable material in a method according to the invention.
Figure 4B:
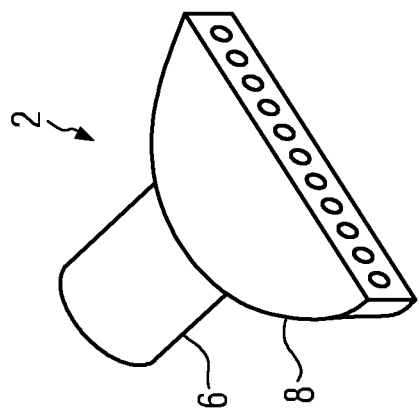
Figure 4A:
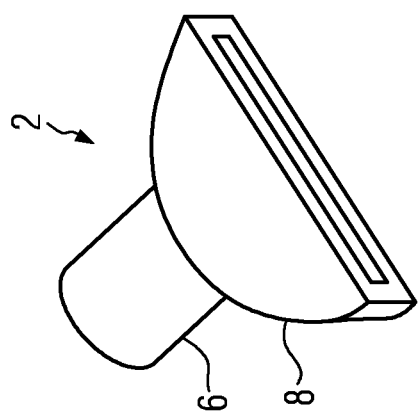

Alternative embodiments for blowers 2 including pressurized air nozzles are shown in FIGS. 4A to 4C as schematic, perspective views. In these views the housing or conduit part 6 with the pressurized air nozzle 8 connected thereto are shown, whereas the fan housing 4 connected thereto has been omitted for simplifying the illustration. In FIG. 4A the pressurized air nozzle is formed as an elongated nozzle gap which comprises an elongated nozzle gap as a single nozzle opening. In FIG. 4B a plurality of nozzle openings are formed which are arranged in an elongated linear arrangement of nozzle openings as the pressurized air nozzle 8, wherein the longitudinally extending series of nozzle openings effectively generates an elongated air stream extending in the longitudinal direction of the arrangement of nozzle openings. In FIG. 4C a pressurized air nozzle 8 having a matrix or array arrangement of nozzle openings in a close neighborhood is shown; this pressurized air nozzle 8 having an array of nozzle openings distributed over an area generates effectively an extensive pressurized air stream which can act on a surface over a large area.

A further housing 10 is attached in the embodiment of FIGS. 3A and 3B to the blower 2, in which housing 10 drive electronics for the operation of the blower in the housing part 4 is accommodated. A cable 12 is connected to the housing 10, wherein the cable 12 contains conductors for electric energy supply for the blower and conductors for transmitting control signals to the drive electronics. In addition, the cable 12 may contain transmission lines for deriving sensor signals. In a preferred embodiment a distance sensor may be present which is fixedly connected to the pressurized air nozzle and which is capable of measuring the distance to the surface of the photopolymerizable material which is present below the pressurized air nozzle. Using this distance sensor the filling level of the material (liquid level) in the vat can be measured on the one hand, and on the other hand elevations or depressions of the surface of the photopolymerizable material can be detected when the pressurized air nozzle is moved together with the distance sensor across the surface. Such sensor 14 is schematically illustrated in FIG. 2C. A control unit may be arranged to intensify the operation of the blower in terms of power if an elevation of the surface compared to the neighboring liquid level is detected, wherein the intensified operation with increased power is continued until the elevation of the surface has been eliminated by displacement of photopolymerizable material and the surface is completely leveled. Such a regulation of the adjusted power of the blower is on the other hand not necessarily required. It can be determined in advance for a photopolymerizable material in dependence on its viscosity at which operational state of the blower the pressurized air jet acts in a sufficient manner on the photopolymerizable material in order to be able to displace it.

Figure 5C:
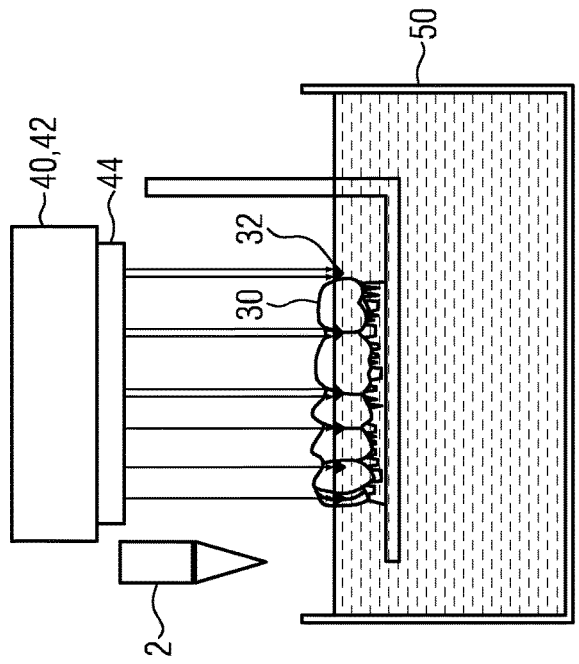
FIGS. 5A, 5B, 5C, 5D, 5E and 5F show subsequent steps in a building method of the present invention, wherein a prosthetic base is, by additive manufacturing, attached to the basal sides of the artificial teeth and is built around the basal end portions of the artificial teeth.
Figure 5D:
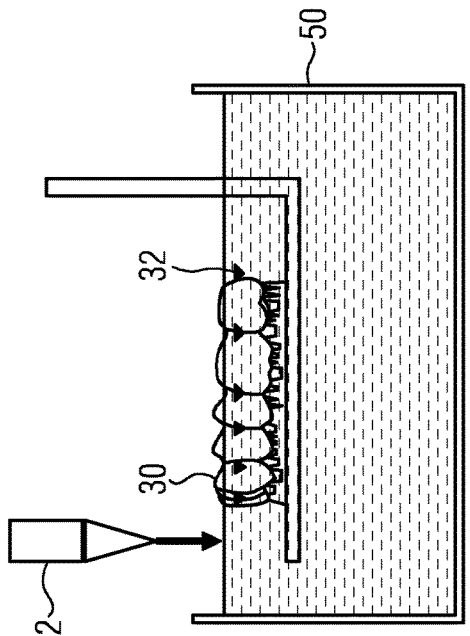
Figure 5A:
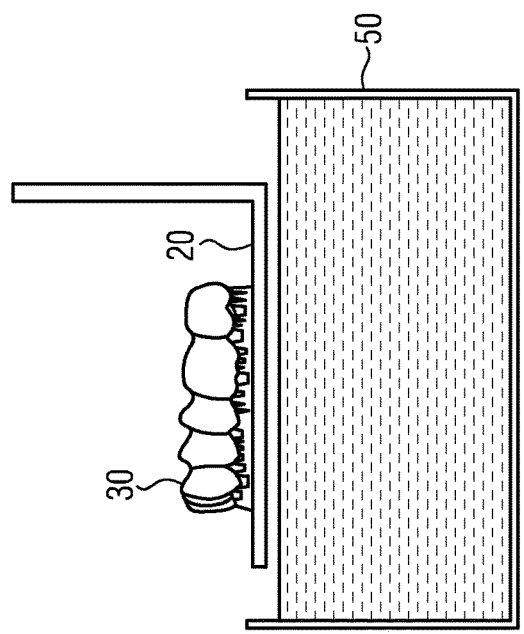
Figure 5B:
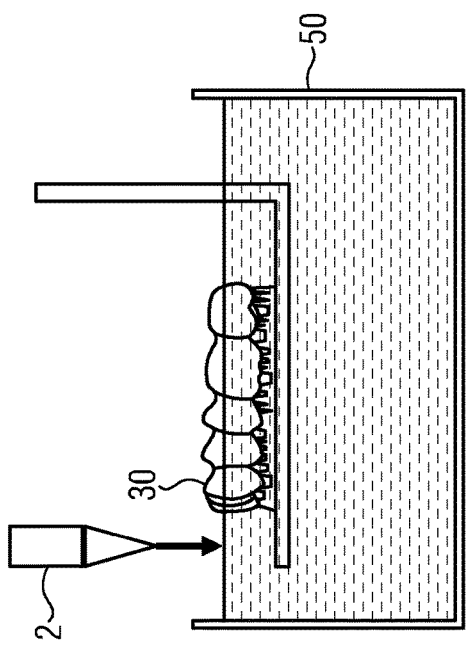

As schematically illustrated in FIGS. 5B and 5D the blower 2 is mounted above a vat 50 of a top-down stereolithography apparatus such that the blower 2 is able to direct a pressurized air jet to the surface of the photopolymerizable material contained in the vat 50. To simplify the illustrations the blower has been omitted in FIGS. 5A and 5C. The pressurized air nozzle is movable at a vertical level above the vat 50 in horizontal direction across the vat in order to be able to act on surface portions of the photopolymerizable material in the vat within the building region. As to the definition of the vertical and horizontal directions it is noted that "vertical" refers to the direction of an orthogonal axis on a (perfectly leveled) liquid level, and "horizontal" refers to a direction of a straight line in a plane parallel to the liquid level. In this connection it is also contemplated that the height of the pressurized air nozzle above the vat may be adjustable so that before carrying out a method of the present invention the height can be adapted to the properties of the product to be built. This means that the pressurized air nozzle can be adjusted to a height above the highest point of an already existing component to which further components of the product are to be added by a method according to the present invention, as will be explained further below. In this manner it is ensured that the pressurized air nozzle cannot collide with the already existing component.

The blower 2 can be moveable along a straight line in a horizontal direction, wherein in the illustrated embodiment the nozzle gap is oriented with its longitudinal extension at an angle to the moving direction such that the nozzle jet has an extension transverse to the moving direction. The angle of the longitudinal direction of the nozzle gap to the moving direction can be in particular 90°, which results in the maximum extension of the pressurized air jet transverse to the moving direction. Alternatively, different moving patterns for moving the pressurized air nozzle across the surface of the photopolymerizable material are possible. For example, the blower can be suspended to be rotatable about a vertical axis such that the pressurized air jet is, by rotation of the blower 2, moved to rotate along the material surface.

The rotational axis may also be shifted with respect to the vertical axis of the cylindrical housing parts 4 and 6 of the blower such that the blower performs a pivotal movement over the material surface. Such a pivotal movement of the blower lets the elongated air stream wipe over the surface similar to a windscreen wiper.

With reference to FIGS. 5A to 5F, a top-down stereolithography method will now be described, in which method a pressurized air nozzle for smoothing the surface of photopolymerizable material is utilized. The stereolithography apparatus is illustrated in a very schematic manner, wherein the blower 2 with its pressurized air nozzle is only shown in FIGS. 5B through 5D in a schematic manner, but is omitted in other views to simplify the illustration. The stereolithography apparatus comprises a vat 50 which is filled with a flowable, photopolymerizable material. A building platform 20 is moveable in the vertical direction and can be immersed into the photopolymerizable material in the vat 50.

An exposure unit is shown in FIG. 5C above the vat 50, but omitted in other views to simplify the illustrations; the exposure unit comprises a light source 40 and a spatial light modulator 42 which are schematically shown as integrated into a single unit, the output of which is projected by projection optics 44 to the image plane. The spatial light modulator (SLM) comprises an array of exposure elements, for example an array of micro mirrors, which exposure elements selectively project light from the light source through the projection optics 44 to associated image elements in the image plane on the surface of the photopolymerizable material. The projection optics 44 can be designed to carry out a conventional projection. In order to improve the precession of the building process the projection optics 44 is preferably formed as a telecentric optics on the object side in order ensure orthogonal incident angles of the position-selective radiation on the material surface in the entire building area to the maximum extent possible.

For the sake of completeness it is noted that for realizing a locally selective exposure also a laser source with a deflection mirror/gyroscope can be used which scans the image plane successively picture element by picture element.

In the present embodiment of FIGS. 5A to 5F, the method according to the invention is utilized in order to layer-wise add a further component to an already existing component or to surround the existing component with an additively manufactured further component built around it. In the present case the product to be built is a dental total prosthesis consisting of a prosthetic base and teeth. In this connection the prosthetic teeth which are arranged as a dental arch are in this case considered as the already existing component. The prosthetic teeth 30 are shown in FIG. 5A as a dental arch which is carried by the building platform 20, wherein the prosthetic teeth 30 are carried by pin-like connectors, so-called support structures which on one side are connected to the occlusal or incisal sides of the prosthetic teeth 30, and on the other side are connected to the building platform 20 so that the prosthetic teeth 30 are oriented with their basal side exposed and facing upwards.

First, the building platform 20 is, under the control of a control unit, lowered into the photopolymerizable material in the vat 50, as shown in FIG. 5B. In order to simplify the description and the wording in the following, reference is made in some places to a lowering step by a particular depth (layer thickness), wherein this is to be understood as the result of a lowering by a larger lowering distance and a subsequent raising step, wherein the difference between the lowering distance and the raising distance corresponds to the layer thickness. By the lowering to the predetermined depth, it is determined where on the already existing component (prosthetic teeth 30) the highest (in the direction basal to occlusal/incisal) portions of the further component (prosthetic base) are added. This predetermined depth is retrieved by the control unit from the two 3D files of the prosthetic base and of the teeth, respectively, which contain the model data in the same coordinate system.

After lowering the building platform 20 to the predetermined depth as shown in FIG. 5B the pressurized air jet from the pressurized air nozzle of the blower 2 is moved across the surface of the photopolymerizable material in order to smooth the surface. As can be seen from FIG. 5B, the pressurized air nozzle can also be moved across regions in which the basal sides of the prosthetic teeth 30 protrude out of the surface of the photopolymerizable material; the latter situation of protruding prosthetic teeth 30 would make use of conventional doctor blade impossible since it would collide with the basal ends of the prosthetic teeth protruding from the surface. By moving a pressurized air jet from a pressurized nozzle of a blower 2 at a level above the vat, which pressurized air jet is extensive in a direction transverse to the moving direction, photopolymerizable material is displaced from elevated areas (menisci) which are raised compared to the remaining liquid level of the photopolymerizable material in the vat, to thereby level the surface as a whole and to define a common uniform liquid level.

Thereafter, as shown in FIG. 5C, the location-dependent exposure is carried out which is controlled by a control unit by controlling the spatial light modulator 42 in accordance with a digital 3D model of the prosthetic base to be built. In the present case first portions 32 of the prosthetic base to be attached are built by solidifying the photopolymerizable material on the prosthetic teeth; in the present case these are portions of the prosthetic base which correspond in the real gum to gingival papillae in the transition zone of neighboring teeth.

Subsequently the building platform is lowered by a further layer thickness downwards into the photopolymerizable material in the vat 50; this state is shown in FIG. 5D. Then the blower 2 is with its transversely extending pressurized air jet again moved across the surface of the photopolymerizable material and the protruding basal and end portions of the prosthetic teeth 30 in order to smooth and level the surface of the photopolymerizable material.

Figure 5E:
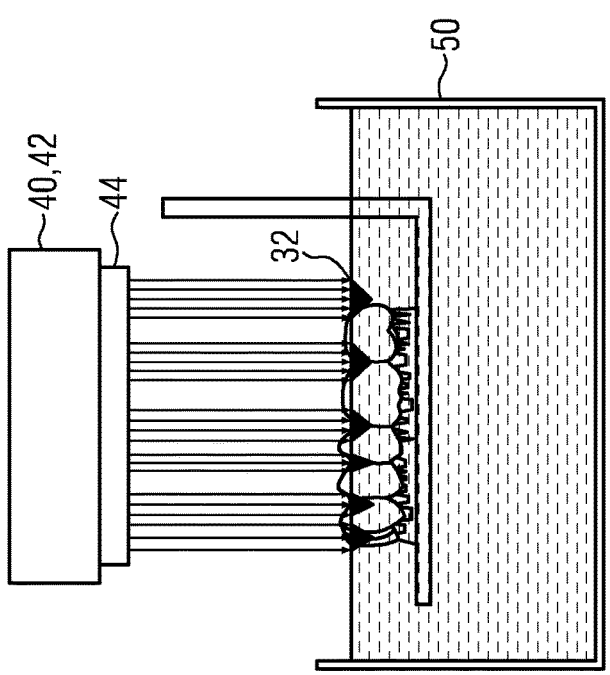

Now follows the next exposure step which is schematically illustrated in FIG. 5E. In this step a further layer is solidified and attached to the previously solidified portions and to portions of the prosthetic teeth. In this manner the portion 32 of the prosthetic base which has been attached by solidification grows layer by layer.

Figure 5F:
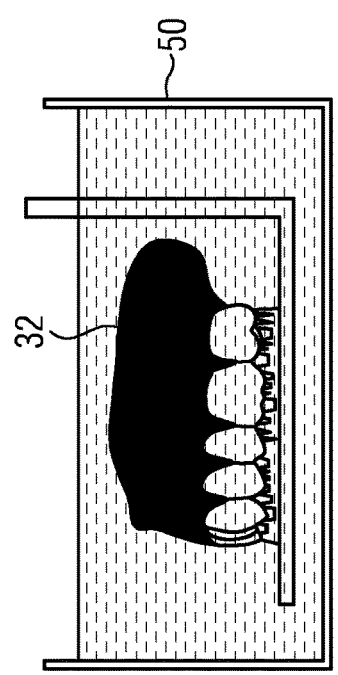

These steps of stepwise lowering (FIG. 5D) and subsequent exposure of a further layer (FIG. 5E) are repeated as often as necessary until the prosthetic base 32 is completely built, as shown in FIG. 5F.

Embedding the basal end portions of the prosthetic teeth by attacking the prosthetic base by layer-wise additive manufacturing results in a strong compound structure of prosthetic teeth and base, without any further joining steps or use of adhesives. The basal end portions of the prosthetic teeth are surrounded by and embedded in the material of the prosthetic base so that the basal end portions of the prosthetic teeth 30 are positively engaged by the attached prosthetic base 32.

In the embodiment described above in connection with FIGS. 5A to 5F it was assumed that the prosthetic teeth 30 are at the beginning of the building already existing and positioned on the building platform. In principle it is possible that the prosthetic teeth 30 are built using a top-down stereolithography method according to the invention. Such an embodiment for a building process for prosthetic teeth is illustrated in FIGS. 6A to 6F. For simplifying the illustration the building process for a single prosthetic tooth is shown; however, with such a method also several prosthetic teeth can be build in parallel or an entire dental arch.

In FIG. 6A it is shown how the building platform is lowered and a first layer for support structures 34 in form of conical support pins have been attached to the building platform by exposure and solidification, wherein after each exposure step the building platform 20 is lowered as explained above by lowering and subsequent raising by a lower distance to effectively lower it to be one layer thickness deeper, whereafter the surface of the photopolymerizable material A is smoothed and leveled by the extensive pressurized air jet from the pressurized air nozzle of the blower 2. The supporting structures 34 are typically built of the same first material A that is also used for the first building part 36, in this case the occlusal or incisal part of the prosthetic tooth to be built. The support structures 34 built are schematically shown in FIG. 6B.

After completion of the first building part 36 (occlusal layer structure of the prosthetic tooth) on the support structures 34 the building platform is raised upwards out of the material A, the first building part 36 is subjected to air blowing using the blower 2 to remove excess material A, and is optionally cleaned in a further vat (see FIG. 7) with cleaning liquid and thereafter dried by air blowing using the blower 2.

For the next building phase using a second photopolymerizable material B the building platform is lowered together with the first building part 36 and the support structures 34 into a second photopolymerizable material B in a further vat 50, as is shown in FIG. 6C. From FIG. 6C it can be seen that at the beginning of the building process for the second building part 37 the first building part 36 is protruding beyond the surface of the photopolymerizable material B. For this reason the distance of the blower 2 to the liquid level has to be at least large enough so that the pressurized air nozzle, when moving across the liquid level does not bump against portions of the first building part 36. According to the present invention smoothing and leveling of the surface of the material to be photopolymerized is achieved by laterally moving the blower 2 at a distance above the surface of the photopolymerizable material.

Further layers of the second building material B are successfully solidified by exposure and added to the occlusal part 36 of the prosthetic tooth, until eventually a further part 37 of the prosthetic tooth has been built attached to the previous part 36, as is shown in FIG. 6D.

Figure 6E:
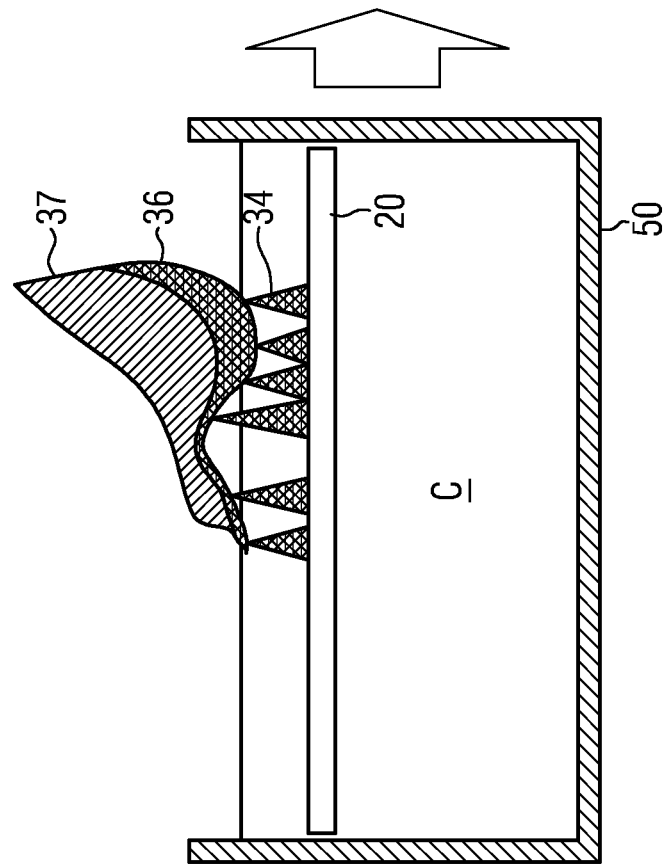
Figure 6F:
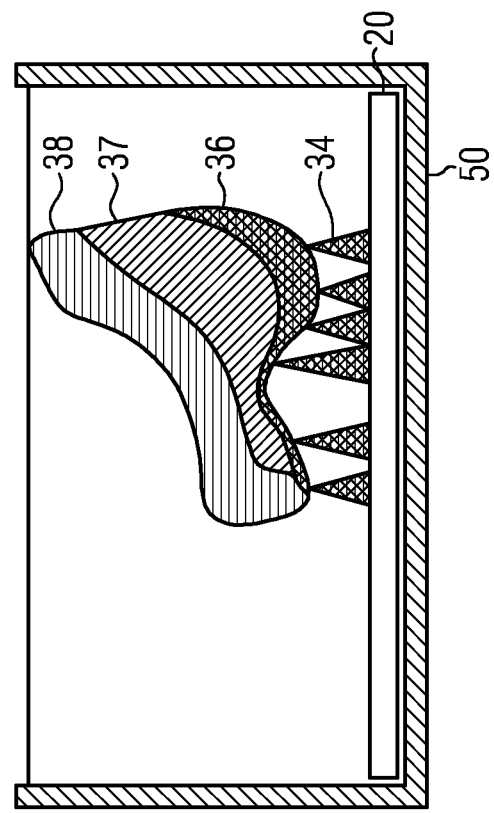

The same sequence as shown in FIGS. 6B to 6D is repeated for a third material C to attach a basal part 38, as shown in FIGS. 6E to 6F. Also in this case the previously generated building part 37 protrudes at the beginning beyond the surface of the photopolymerizable material C, and thus makes necessary the use of the blower 2 which is suspended at a distance above the material level, to act by a pressurized air jet from the pressurized air nozzle remotely on the surface for smoothing and leveling the surface of the photopolymerizable material C by the pressurized air stream.

Figure 6H:
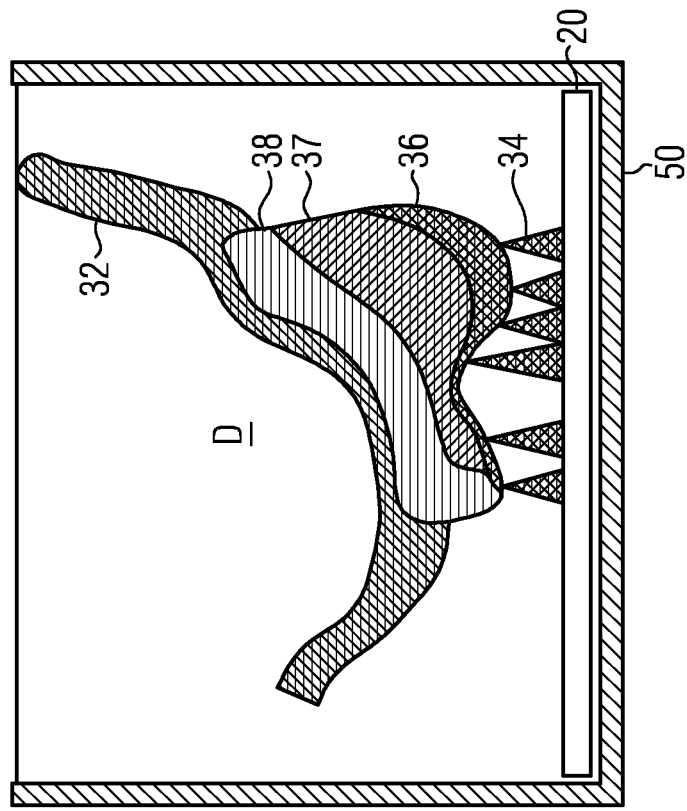
FIGS. 6G and 6H show subsequent steps in a building method according to the present invention, wherein material for a prosthetic base is attached and built around an artificial tooth.
Figure 6G:
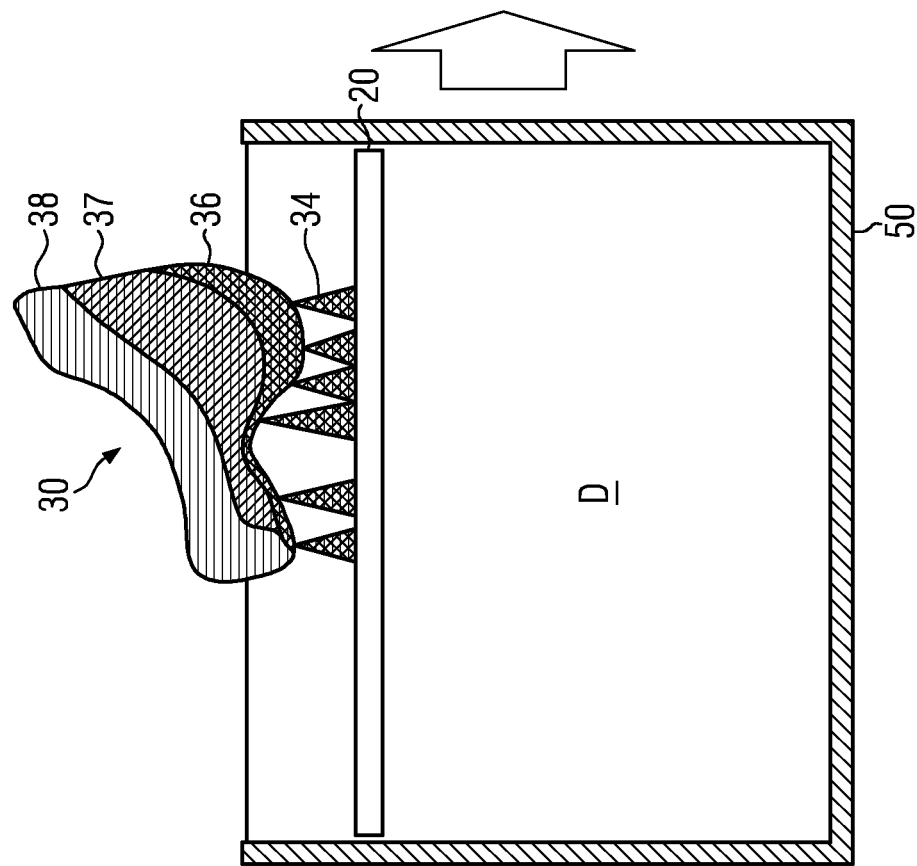

Similar to the building process described in connection with FIGS. 5A to 5F for attaching a prosthetic base to the built up parts 26, 37, and 38 of the prosthetic tooth a prosthetic base 32 can be attached by successive solidification of layers of a fourth photopolymerizable material D. This building process is schematically illustrated by the transition from the state in FIG. 6G to the state in FIG. 6H.

After completion of the last building steps the building platform 20 and the completed building part additively generated from different materials can be cleaned by blowing it off using the blower 2, can be further cleaned in a cleaning bath, and thereafter be dried by air blowing using the blower 2.

Figure 7:
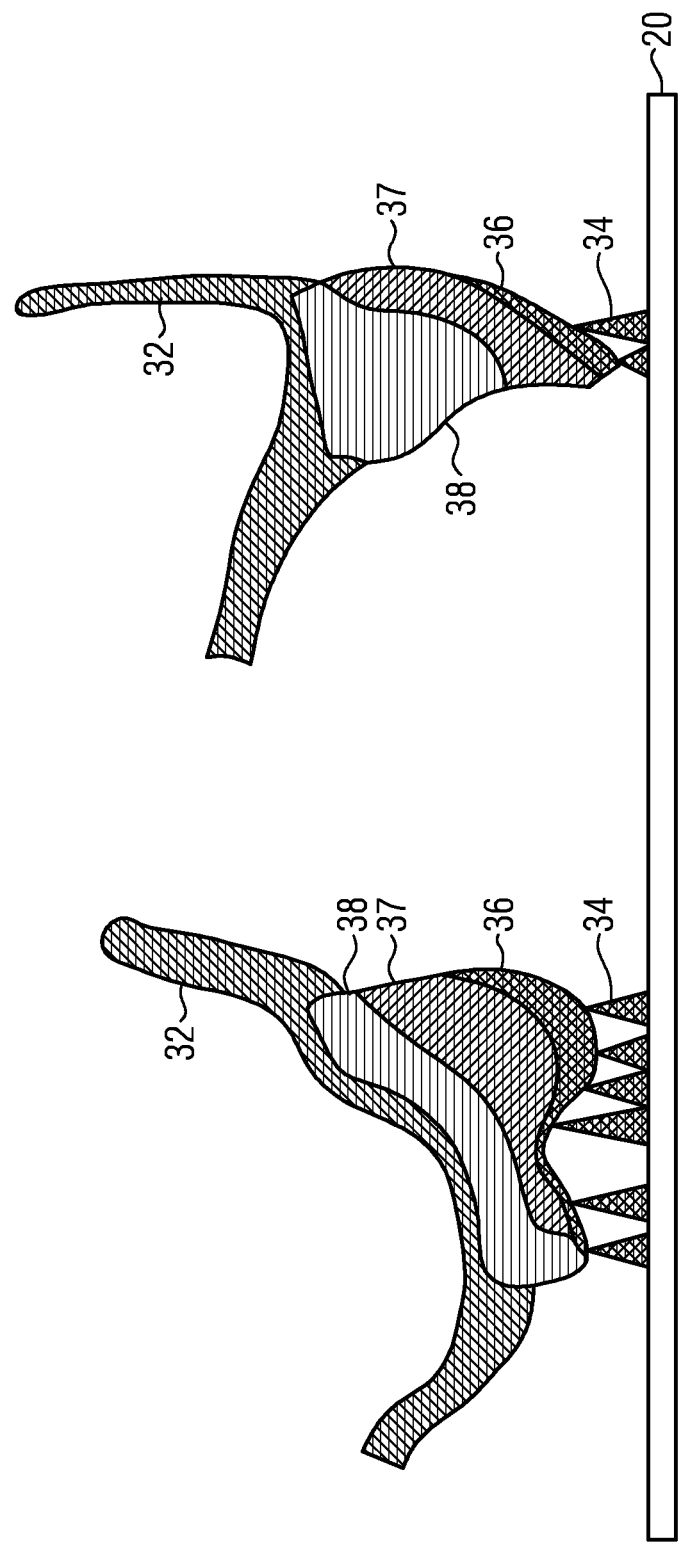
FIG. 7 shows in cross-section artificial teeth built by using a method according to FIG. 6, and prosthetic base embedding the basal sides of the artificial teeth by additively building it according to the present invention.

FIG. 7 shows cross-sectional views of products built on the building platform, on the left side in the area of a molar, and on the right side in the area of an incisor of a prosthetic part, in each case including an occlusal/incisal part 36 (incisal area), a further part 37 (dentin) and a basal part 38 (root) and attached prosthetic base 32, which can be built up using a method as described above with reference to FIGS. 6A to 6H. Of course, the prosthetic teeth can be built with less or more than three parts 36, 37, 38.

In FIGS. 8A to 8F a building process for an orthodontic plate including metallic insert parts is schematically shown, which orthodontic plate can be built with a method according to the invention, wherein the metallic components, such as wires and brace elements, are embedded in additively cured polymer layers and may partially protrude from the polymer plate.

When applying the inventive top-down stereolithography method in a first building phase support structures 34, here schematically illustrated with conical shape, and a lower part of the orthodontic plate 60 with recesses 62 are built on the building platform 20 using the same material D by layerwise adding photopolymerizable material and by position selective exposure, as is shown in FIG. 8A.

This initially built lower part of the orthodontic plate 60 including recesses 62 is then moved out of the vat and out of the photopolymerizable material D by raising the building platform 20 so that the lower part of the orthodontic plate with recesses 62 is freely accessible, as shown in FIG. 8B.

Thereafter, prefabricated metal elements 64, such as specifically bent wires and brace elements, are inserted into the intended recesses 62. In this case the lower part of the orthodontic plate 60 with its recesses and the inserted metal elements 64, as shown in FIG. 8C, may also be considered as an already existing component of the dental product (complete orthodontic plate) to be built, wherein to this already existing components further components have to be added by a preferred embodiment of the present invention to complete the product.

Figure 8D:
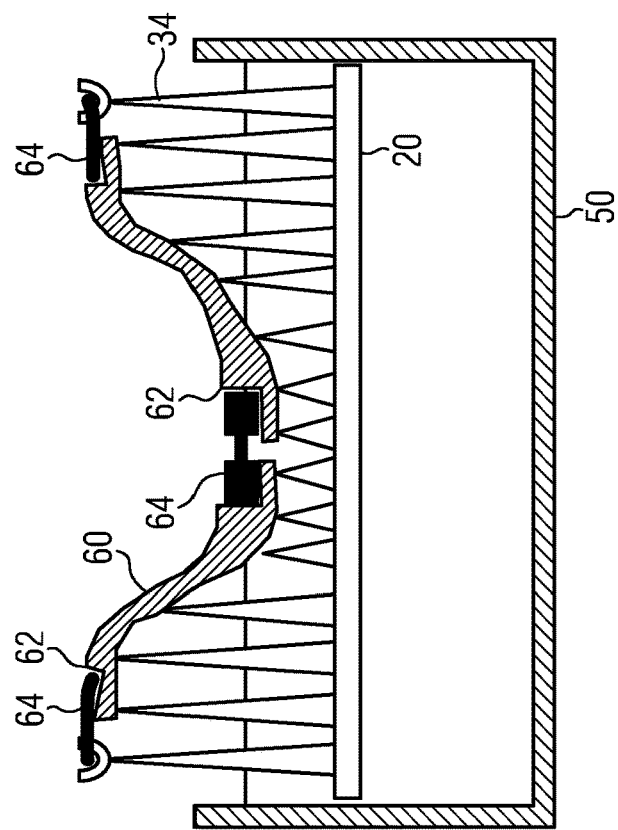
Figure 8C:
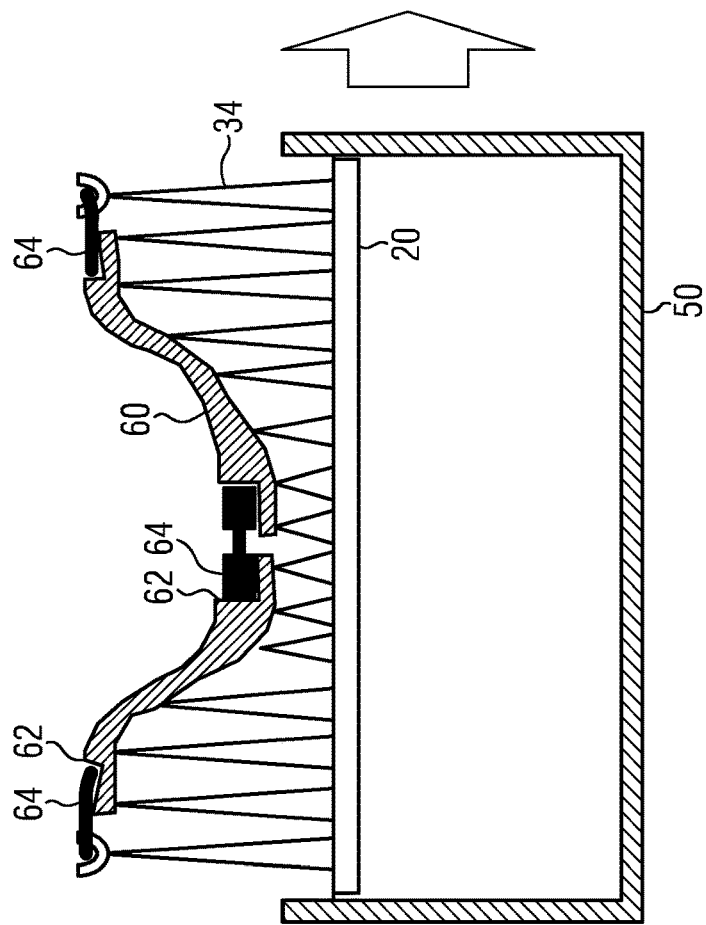

In the now following second building phase the recesses 62 with the inserted metal parts 64 placed therein are, by lowering the building platform, smoothing the surface by means of the air doctor blade (blower 2) and position dependent exposure are successively filled up layer by layer and closed, as shown in FIG. 8D. In this manner the insert components 64 are embedded in the orthodontic plate in a positive fitting manner, as shown in FIG. 8E. For this process of additive manufacturing there are 3D data files for the support structures, in the orthodontic plate 60 including the recesses 62 and the insert components in the recesses 62 in the same coordinate system for controlling the building process.

In order to start at the position of the lowermost recess (in the center) with layer by layer solidification and filling of the recess, the lower part of the orthodontic 60 with the insert components 64 in the recesses is lowered into the material vat only to the extent that also in this case parts of the product already built protrude on the right hand and left hand side upwards beyond the surface of the photopolymerizable material, see FIG. 5D. During the layer-wise building steps for filling the recesses 62 it is necessary, after each lowering step of the building platform by a distance corresponding to a layer thickness, to smooth the surface of the photopolymerizable material by moving the blower 2 with the pressurized air stream directed to the surface of the layer now to be solidified, without contacting the surface. A conventional doctor blade would also in this case collide with the parts of the already built components protruding beyond the surface.

Figure 8F:
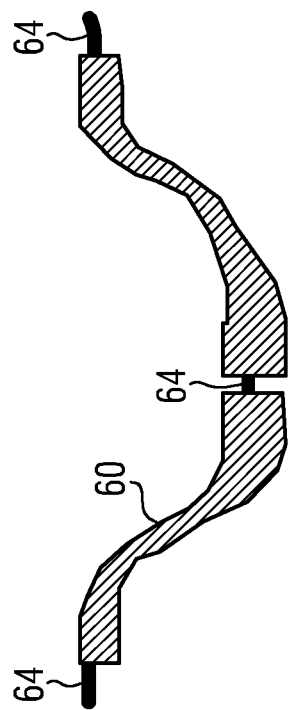
Figure 8E:
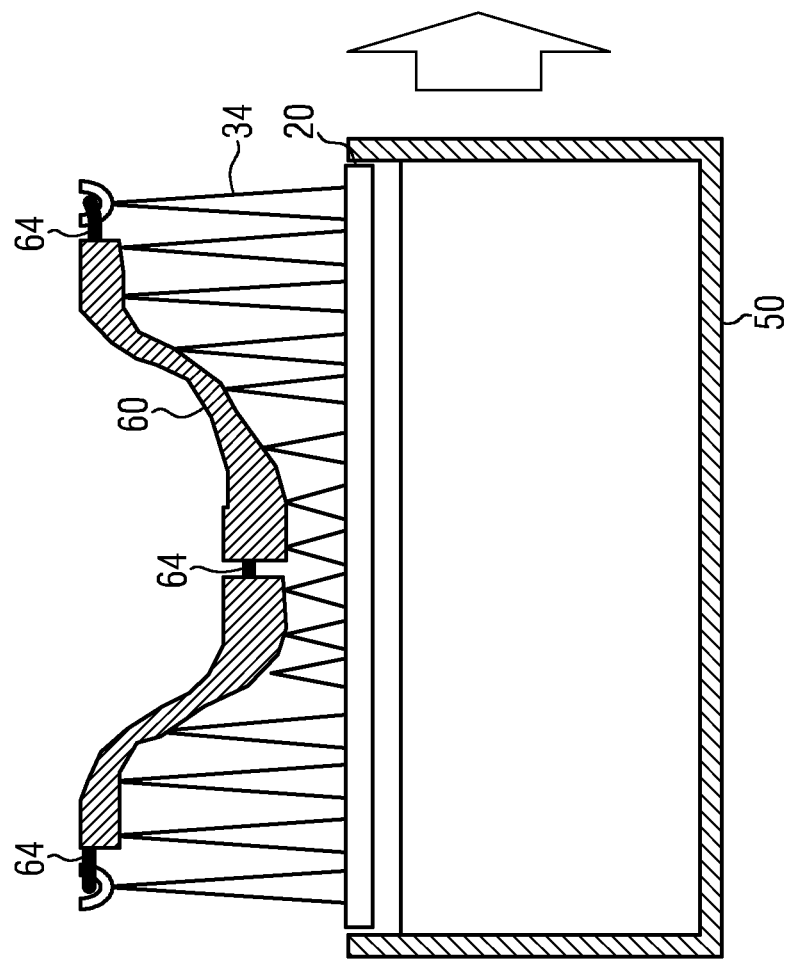

After the second building phase has been completed by closing the recesses 62, and after the required post processing (cleaning, finishing, removal of support structures and polishing) the completed of orthodontic plate 60 including embedded insert components 64 are obtained, as shown in FIG. 8F.

Figure 9:
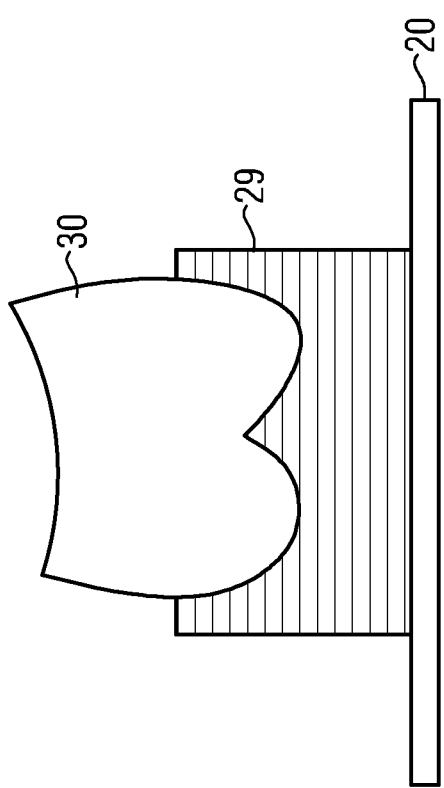
FIG. 9 shows a schematic cross-sectional view of a building platform with a holder for positioning an artificial tooth fabricated by another method, which artificial tooth is to be embedded at its upper, exposed, basal side in a prosthetic base by a method as shown in FIGS. 5A to 5F.

FIG. 9 schematically shows an initial situation in which a prefabricated artificial tooth or a prefabricated artificial dental arch is the already existing component, wherein a prosthetic base is to be attached on the basal side of the artificial tooth by additive manufacturing, as it has been described in connection with FIGS. 5A to 5F. In contrast to the method described with reference to FIGS. 6A to 6H in which also the artificial teeth 30 were built by carrying out the method of the present invention, in the example of FIG. 9 a prefabricated artificial tooth 30 is used which has been manufactured by a different method. In this case first a holder 29 is built on the building platform 20 by means of the top-down stereolithography method, wherein the holder 29 is provided with recesses which are complementary to the occlusal/incisal portions of the artificial tooth such that the artificial tooth 30 may be inserted therein and be held in a precisely defined position in the holder. Thereafter, a prosthetic base can be added using a top-down stereolithography method according to the invention attaching the prosthetic base to the basal sides of the artificial teeth such that the basal portion of the artificial tooth 30 finally is embedded in the attached prosthetic base (not shown) in a positively fitting manner.

Figure 10:
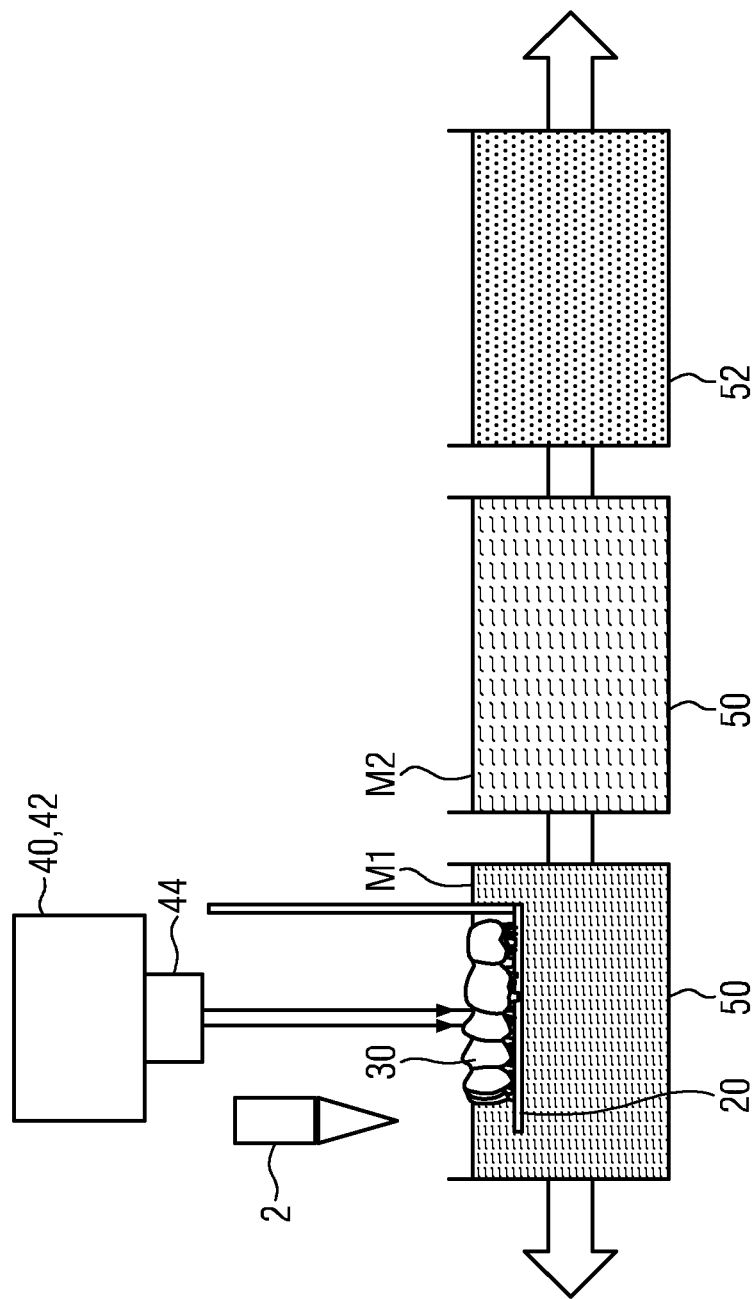
FIGS. 10, 11 and 12 show subsequent steps in a method according to the invention for building artificial teeth and for subsequent attachment of a prosthetic base by additive manufacturing.
Figure 11:
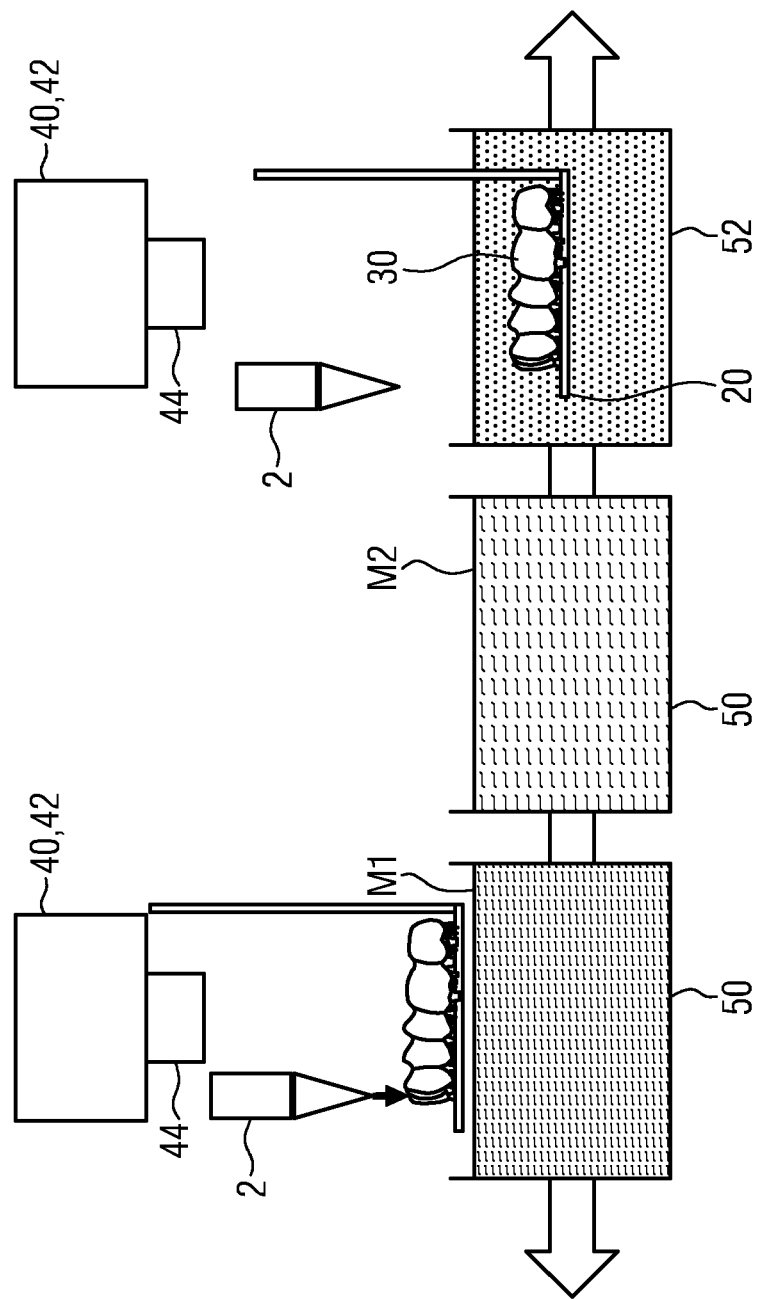
Figure 12:
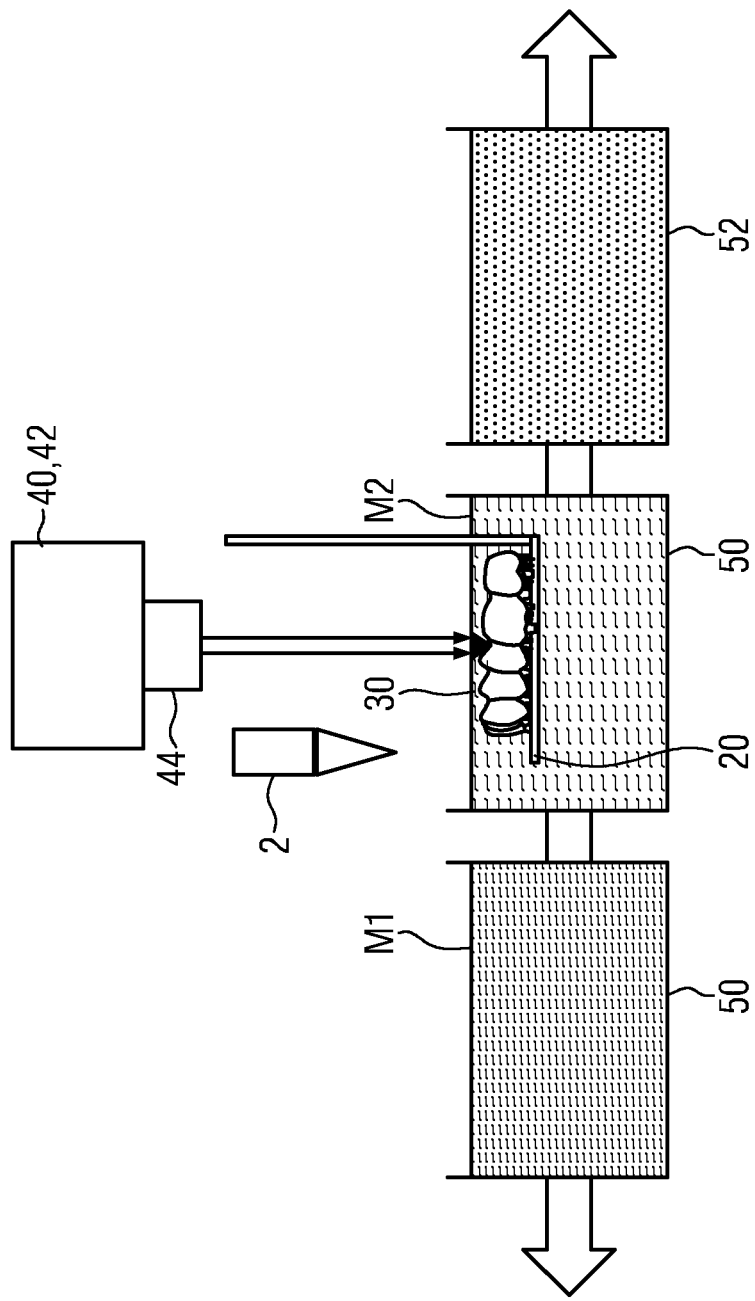

In FIGS. 10, 11 and 12 a building process according to the present invention is once more summarized, in which in a first phase prosthetic teeth 30 have been built on a building platform by a top-down stereolithography method according to the present invention, wherein several different building materials can be used, as has for example been explained in connection with FIGS. 6A to 6H, wherein before each change of building material for building a further component of the prosthetic teeth a cleaning process is carried out.

A possible cleaning process during the transition from one building material to another will be described here once more in some detail: After termination of a building phase the building platform 20 is raised out of the vat, and the built parts are blown with air from the blower 2 in order to remove still adhering, non-polymerized material; this step is carried out above the same vat that has been used in previous building phase (see FIG. 11 on the left hand side), so that blown off material is collected in the correct vat. Optionally, the cleaning process can be continued in a cleaning liquid in a cleaning vat 52; in this case the building platform 20 is lowered into a vat with cleaning liquid, as is shown in FIG. 11 on the right hand side. Then the building platform with the parts built thereon is raised again out of the cleaning liquid, and is blown off with air from the blower 2 above the cleaning vat for drying. Thereafter, a further building phase with a further building material can be carried out.

In FIG. 10 the last step of building prosthetic teeth 30 is shown, wherein in this step a layer of photopolymerizable material M1 is solidified as the last piece of a prosthetic tooth.

Thereafter a further cleaning of the prosthetic teeth 30 is carried out as described above. Then the vats 50 can be moved such that the vat 50 with material M2 is in the area of the building platform 20 so that this building platform can be lowered into the vat 50 with the photopolymerizable material M2 to attach a prosthetic base to the prosthetic teeth 30 as already existing component, wherein the prosthetic base is attached by building it using a method according to the present invention, wherein the start of this building phase is shown in FIG. 12. After each step of attaching a layer of the prosthetic base to the basal portions of the prosthetic teeth and the following lowering of the building platform and raising it up again up to a layer thickness for forming a new layer of photopolymerizable material, the surface of the newly defined layer is smoothed and leveled by moving the blower 2 with its pressurized air stream across the surface.

In some embodiments, the processors may comprise a hardware processor such as a central processing unit (CPU), a graphic processing unit (GPU), a general-purpose processing unit, or computing platform. The one or more processors may be comprised of any of a variety of suitable integrated circuits, microprocessors, logic devices and the like. Although the disclosure is described with reference to a processor, other types of integrated circuits and logic devices may also be applicable.

In some embodiments, a computer system may include memory or memory locations (e.g., random-access memory, read-only memory, flash memory), electronic storage units (e.g., hard disks), communication interfaces (e.g., network adapters) for communicating with one or more other systems, and peripheral devices, such as cache, other memory, data storage and/or electronic display adapters. The memory, storage units, interfaces and peripheral devices may be in communication with the one or more processors, e.g., a CPU, through a communication bus, e.g., as is found on a motherboard. The storage unit(s) may be data storage unit(s) (or data repositories) for storing data.

The one or more processors, e.g., a CPU, execute a sequence of machine-readable instructions, which are embodied in a program (or software). The instructions are stored in a memory location. The instructions are directed to the CPU, which subsequently program or otherwise configure the CPU to implement the methods of the present disclosure. Examples of operations performed by the CPU include fetch, decode, execute, and write back. The CPU may be part of a circuit, such as an integrated circuit. One or more other components of the system may be included in the circuit. In some cases, the circuit is an application specific integrated circuit (ASIC).

In some embodiments, the computer system typically includes, or may be in communication with, an electronic display for providing, for example, images captured by a machine vision system. The display is typically also capable of providing a user interface (UI). Examples of UI's include, but are not limited to, graphical user interfaces (GUIs), web-based user interfaces, and the like.

The invention claimed is:

1. A method for additive manufacturing of a three-dimensional product comprising
using top-down stereolithography, in which method flowable, photopolymerizable material in a vat (50) is solidified by selective exposure from above, wherein, from a pressurized gas nozzle of a blower (2) which is moveable above a liquid level in the vat, a pressurized gas jet extensive in a direction transverse to the moving direction of the blower (2) is directed to a surface of the photopolymerizable material and acts on areas of the surface to be solidified in order to smooth and level the surface by moving the pressurized gas jet from the blower across the surface.

2. The method according to claim 1,
wherein an already existing component is provided for attachment to the three-dimensional product to be built,
wherein the already existing component is carried by a building platform (20) located below the already existing component,
wherein the building platform (20) is lowered in the vat (50) into the flowable, photopolymerizable material for defining a new layer and is raised again to be effectively located one layer thickness deeper in the photopolymerizable material,
wherein the pressurized gas nozzle of the blower (2) is movable in such a height above the vat that after the first lowering of the building platform (20) the pressurized gas nozzle is located higher than a highest point of the already existing component,
wherein the pressurized gas nozzle (2) is moved across areas of the photopolymerizable material to be solidified, in order to smooth and level its surface,
wherein the surface of the photopolymerizable material is exposed selectively, and
wherein the last three steps are repeated until the three-dimensional product to be built is manufactured and attached to the already existing component.

3. The method according to claim 2,
wherein the distance to the surface of the photopolymerizable material is measured with a distance sensor fixedly connected to the blower (2).

4. The method according to claim 3,
wherein the distance to the surface of the photopolymerizable material measured by the distance sensor is utilized to control operating parameters of the blower (2) moving across the surface of the photopolymerizable material to the effect that the generated pressurized gas stream causes a position dependent displacement of photopolymerizable material in the area covered in order to specifically smooth and level the surface of the photopolymerizable material.

5. The method according to claim 4,
wherein the distance to the surface of the photopolymerizable material measured by the distance sensor is utilized to adjust an image plane of an exposure unit to the surface of the photopolymerizable material and to the building plane, wherein for this purpose the exposure unit and/or the material vat are moved.

6. The method according to claim 5,
wherein for controlling the operation of the blower (2) for smoothing and leveling the surface of the photopolymerizable material, parameter(s) comprising pressure, width of the jet, volumetric flow rate, moving speed of the pressurized gas nozzle of the blower (2) relative to the surface and/or angle of inclination of the pressurized gas jet ejected from the pressurized gas nozzle of the blower (2) with respect to an orthogonal axis on the surface of the photopolymerizable material is/are controlled in order to realize a defined distance to the surface uniformly across an area to be solidified and to obtain a defined, uniform material layer on top of a last cured region.

7. The method according to claim 6,
wherein the pressurized gas nozzle is formed with an elongated nozzle gap as an air blade which is moved across the surface of the photopolymerizable material with an adjustable angle of inclination in a range of +−45° to an orthogonal axis on the surface of the photopolymerizable material.

8. The method according to claim 2,
wherein the already existing component is at least partially embedded by selectively attached solidified photopolymer so that the embedded portion is surrounded by solidified photopolymer.

9. The method according to claim 1,
wherein in a plurality of steps for attaching a plurality of further components (36, 37, 38) several different photopolymerizable materials are used subsequently as building material for building the product.

10. The method according to claim 2,
wherein the existing component of the product has been previously built using the method used to build the three-dimensional product to be built.

11. The method according to claim 2,
wherein in a first building phase a first part of the product which includes at least one recess (62) for inserting an existing component is built,
wherein the existing component (64) is inserted in the at least one recess (62), and subsequently on top of that a further part of the product (60) is built, such that the inserted existing component (64) is embedded by the built parts and is at least partially enclosed.

12. The method according to claim 11,
wherein the first part of the product is a part of a dental or orthodontic product,
wherein as existing component a metallic or ceramic component (64) or a component (64) made of plastic or composite is inserted in the recess (62) of the first part, and wherein the existing component is then embedded by a further part of the product (60) built to enclose the existing component.

13. The method according to claim 2,
wherein the already existing component is an artificial dental arch or a part thereof,
wherein the artificial dental arch or the part thereof is supported on the building platform (20) with the basal side facing upwards, and
wherein as a further component a prosthetic base (32) or a part thereof is attached around the basal regions of the artificial dental arch or the part thereof such that the artificial dental arch or the part thereof is embedded in the attached prosthetic base (32) in a positively fitting manner.

14. The method according to claim 2,
wherein a dental or orthodontic product is generated by building around an already existing component further parts of the product, such that the dental or orthodontic product is formed as a positive-locking composite of the already existing component and the attached further parts, without joining or adhesively connecting them.

15. The method according to claim 1,
wherein as pressurized gas for the blower (2) pressurized air is used, which pressurized air is supplied to the pressurized gas nozzle, formed as a pressurized air nozzle, by a fan, a compressor or by a pressurized air reservoir.

16. The method according to claim 15,
wherein after an exposure step the building platform is raised above the liquid level and the already built part are blown off with the pressurized air stream from the blower (2) for cleaning, in order to remove adhering, unpolymerized excess material, and wherein optionally thereafter the building platform is immersed in a bath of cleaning liquid and is lifted up out of the cleaning liquid again and thereafter the already built parts are blown off using a pressurized air stream from the blower (2) for drying.

17. An apparatus for carrying out a method for additive manufacturing of a three-dimensional product using top-down stereolithography comprising a control unit in which digital 3D models of the components of the product to be built are stored, a vertically moveable exposure unit (40, 42, 44) which is adapted to, under the control of the control unit, expose and solidify photopolymerizable material in a vat (50) by exposure from above in a locally selective manner, a vertically movable building platform (20) carrying the product being built, which building platform can be lowered under the control of control unit in vertical direction into the photopolymerizable material in the vat (50), wherein the control unit is arranged to lower the building platform (20) by more than a layer thickness and raise it again so that it is lowered by a layer thickness in order to form a new layer of photopolymerizable material, and to operate the exposure unit (40, 42, 44) thereafter for exposing in a locally selective manner in the predetermined area dedicated for this layer, in order to solidify the layer in the predetermined shape, and to repeat the last two steps until the product or a component of the product is built in the predetermined three-dimensional shape, wherein a pressurized gas nozzle of a blower (2) is suspended above the vat and is moveable under the control of the control unit across the surface of the photopolymerizable material, wherein the pressurized gas nozzle is arranged to direct a pressurized gas jet, which is extensive in a direction transverse to its moving direction, on the surface of the photopolymerizable material in order to, after each step or further lowering and lifting the building platform (20) for forming a new layer of photopolymerizable material, smooth and level its surface by the action of the pressurized gas jet from the pressurized gas nozzle.

18. The apparatus according to claim 17, wherein the exposure unit includes projection optics (44) which performs on the object side telecentric imaging.

* * * * *